US010638346B2

(12) United States Patent
Subrahmanya et al.

(10) Patent No.: US 10,638,346 B2
(45) Date of Patent: Apr. 28, 2020

(54) CHANNEL STATE COMPUTATION FOR ENHANCED CARRIER AGGREGATION

(71) Applicant: QUALCOMM Incorporated, San Diego, CA (US)

(72) Inventors: Parvathanathan Subrahmanya, Sunnyvale, CA (US); Qiang Shen, San Diego, CA (US); Aamod Dinkar Khandekar, San Diego, CA (US); Mariam Motamed, Redwood City, CA (US); Wanshi Chen, San Diego, CA (US); Hanfang Pan, San Diego, CA (US); Deepak Mathew, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 15/234,634

(22) Filed: Aug. 11, 2016

(65) Prior Publication Data

US 2017/0094545 A1   Mar. 30, 2017

Related U.S. Application Data

(60) Provisional application No. 62/233,262, filed on Sep. 25, 2015.

(51) Int. Cl.
*H04W 24/10* (2009.01)
*H04L 5/00* (2006.01)
(Continued)

(52) U.S. Cl.
CPC ........... *H04W 24/10* (2013.01); *H04L 1/0026* (2013.01); *H04L 1/0027* (2013.01);
(Continued)

(58) Field of Classification Search
CPC ...... H04W 24/10; H04W 8/22; H04L 1/0026; H04L 1/0027; H04L 1/0029
See application file for complete search history.

(56) References Cited

U.S. PATENT DOCUMENTS

| 2014/0078919 A1 | 3/2014 | Hammarwall |
| 2015/0023194 A1* | 1/2015 | Seo ........................ H04W 24/10 370/252 |

(Continued)

FOREIGN PATENT DOCUMENTS

| EP | 2804425 A1 | 11/2014 |
| EP | 2905988 A1 | 8/2015 |

OTHER PUBLICATIONS

ISA/EP, International Search Report and Written Opinion of the International Searching Authority, Int'l Application No. PCT/US2016/046736, dated Oct. 21, 2016, European Patent Office, Rijswijk, NL, 14 pgs.

*Primary Examiner* — Ricky Q Ngo
*Assistant Examiner* — Stephen N Steiner
(74) *Attorney, Agent, or Firm* — Holland & Hart LLP

(57) ABSTRACT

Methods, systems, and devices for wireless communication are described. A user equipment (UE) utilizing enhanced carrier aggregation (eCA) may identify a limit to the number of channel state feedback (CSF) processes it is capable of supporting. The UE may transmit an indication of this limit to a base station, which may configure the UE for channel state reporting, and send channel state reporting triggers according to the indicated limit. The UE's determination of the limit to the number of CSF processes may be based on various transmit or receive antenna configurations. A single trigger may correspond to reports covering multiple subframes and/or component carriers. The base station may also arrange the channel state reporting configuration to reduce the peak number of channel state reports that the UE
(Continued)

processes during each subframe. The UE may also determine that a number of channel state processes needed to support channel state reporting in a subframe exceeds its capacity. The UE may then prioritize the channel state processes and/or may transmit one or more non-current reports.

20 Claims, 20 Drawing Sheets

(51) Int. Cl.
  *H04L 1/00* (2006.01)
  *H04W 8/22* (2009.01)
(52) U.S. Cl.
  CPC ............ *H04L 1/0029* (2013.01); *H04L 5/001* (2013.01); *H04L 5/0048* (2013.01); *H04L 5/0057* (2013.01); *H04W 8/22* (2013.01)

(56) References Cited

U.S. PATENT DOCUMENTS

| | | | |
|---|---|---|---|
| 2015/0264694 A1* | 9/2015 | Nagata | H04L 25/0224 370/329 |
| 2018/0102824 A1* | 4/2018 | Jitsukawa | H04B 7/0617 |

* cited by examiner

CHANNEL STATE COMPUTATION FOR ENHANCED CARRIER AGGREGATION

CROSS REFERENCE

The present Application for Patent claims priority to U.S. Provisional Patent Application No. 62/233,262 by Subrahmanya et al., entitled "Channel State Computation for Enhanced Carrier Aggregation," filed Sep. 25, 2015, assigned to the assignee hereof.

BACKGROUND

The following relates generally to wireless communication, and more specifically to channel state computation for enhanced carrier aggregation (eCA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a UE and a base station may communicate using a large number of component carriers (CCs) in eCA operation. The UE may compute channel state information (CSI) for these carriers. In some cases, a processing capacity needed to compute CSI for a large number of carriers may exceed the processing capability of the UE. This may result in delays or missed reports, which may negatively impact the efficiency of communications on the effected CCs.

SUMMARY

A user equipment (UE) utilizing enhanced carrier aggregation (eCA) may identify a limit to the number of channel state processes it is capable of handling. The UE may transmit this limit to a base station, which may configure a channel state reporting configuration, and send channel state reporting triggers according to the indicated limit. The UE may determine the limit based, for instance, on transmit antenna ports or available receive antennas. In some cases, a single trigger may correspond to reports covering multiple subframes. The base station may also arrange the channel state reporting configuration to reduce the peak number of channel state reports that the UE processes during each subframe. In some cases, the UE may determine that a number of channel state processes in a subframe needed to provide the channel state reporting exceeds its capacity. The UE may then prioritize the channel state processes and, in some cases, transmit a non-current report.

A method of wireless communication is described. The method may include identifying a carrier aggregation (CA) configuration comprising a plurality of component carriers (CCs), and identifying a channel state reporting process limit associated with the CA configuration based at least in part on a processing capability and at least one of an antenna configuration or a control channel configuration. In some aspects, the method may include transmitting an indication of the channel state reporting process limit to a base station.

An apparatus for wireless communication is described. The apparatus may include means for identifying a CA configuration comprising a plurality of CCs, and means for identifying a channel state reporting process limit associated with the CA configuration based at least in part on a processing capability and at least one of an antenna configuration or a control channel configuration. In some aspects, the apparatus may include means for transmitting an indication of the channel state reporting process limit to a base station.

A further apparatus is described. The apparatus may include a processor, memory in electronic communication with the processor, and instructions stored in the memory. The instructions may be operable to cause the apparatus to identify a CA configuration comprising a plurality of CCs, and identify a channel state reporting process limit associated with the CA configuration based at least in part on a processing capability and at least one of an antenna configuration or a control channel configuration. In some aspects, the instructions may be operable to cause the apparatus to transmit an indication of the channel state reporting process limit to a base station.

A non-transitory computer readable medium for wireless communication is described. The non-transitory computer-readable medium may include instructions executable to identify a CA configuration comprising a set of CCs, and identify a channel state reporting process limit associated with the CA configuration based on a processing capability and at least one of an antenna configuration or a control channel configuration. In some aspects, the instructions may be executable to transmit an indication of the channel state reporting process limit to a base station.

Some examples of the method, apparatus, or non-transitory computer-readable medium described above may further include processes, features, means, or instructions for transmitting one or more channel state reports to the base station according to the channel state reporting process limit.

Some examples of the method, apparatus, or non-transitory computer-readable medium described above may further include processes, features, means, or instructions for determining that a number of channel state reports exceeds the channel state reporting process limit. Some examples of the method, apparatus, or non-transitory computer-readable medium described above may further include processes, features, means, or instructions for prioritizing the one or more channel state reports based on the channel state reporting process limit, where the one or more channel state reports are transmitted according to the prioritization.

Some examples of the method, apparatus, or non-transitory computer-readable medium described above may further include processes, features, means, or instructions for transmitting an indication of the antenna configuration to a base station.

In some examples of the method, apparatus, or non-transitory computer-readable medium described above, the antenna configuration comprises a number of receive antennas and the channel state reporting process limit is identified based on the number of receive antennas. In some examples of the method, apparatus, or non-transitory computer-readable medium described above, the control channel configuration comprises a physical downlink control channel (PDCCH) and the channel state reporting process limit is identified based on receiving downlink (DL) signaling in the PDCCH.

In some examples of the method, apparatus, or non-transitory computer-readable medium described above, the control channel configuration comprises an enhanced physical downlink control channel (ePDCCH) and the channel state reporting process limit is identified based on receiving DL signaling in the ePDCCH.

In some examples of the method, apparatus, or non-transitory computer-readable medium described above, the indication may include a number of channel state processes for each CC of the set of CCs.

A method of wireless communication is described. The method may include receiving a trigger for a channel state report from a base station, transmitting a first channel state report in a first subframe based at least in part on the trigger for the channel state report and transmitting a second channel state report in a second subframe based at least in part on the trigger for the channel state report.

An apparatus for wireless communication is described. The apparatus may include means for receiving a trigger for a channel state report from a base station, means for transmitting a first channel state report in a first subframe based at least in part on the trigger for the channel state report and means for transmitting a second channel state report in a second subframe based at least in part on the trigger for the channel state report.

A further apparatus is described. The apparatus may include a processor, memory in electronic communication with the processor, and instructions stored in the memory. The instructions may be operable to cause the apparatus to receive a trigger for a channel state report from a base station, transmit a first channel state report in a first subframe based at least in part on the trigger for the channel state report and transmit a second channel state report in a second subframe based at least in part on the trigger for the channel state report.

A non-transitory computer readable medium for wireless communication is described. The non-transitory computer-readable medium may include instructions executable to receive a trigger for a channel state report from a base station, transmit a first channel state report in a first subframe based on the trigger for the channel state report and transmit a second channel state report in a second subframe based on the trigger for the channel state report.

Some examples of the method, apparatus, or non-transitory computer-readable medium described above may further include processes, features, means, or instructions for determining that a number of channel state reports associated with the trigger exceeds a threshold. Some examples of the method, apparatus, or non-transitory computer-readable medium described above may further include processes, features, means, or instructions for transmitting a non-current channel state report during the subframe based on the determination, where the non-current channel state report is associated with a previous trigger.

A method of wireless communication is described. The method may include establishing a CA configuration for a UE, wherein the CA configuration comprises a plurality of CCs, receiving an indication of a channel state reporting process limit from the UE, wherein the channel state reporting process limit is based at least in part on a processing capability of the UE and at least one of an antenna configuration or a control channel configuration and transmitting a channel state reporting configuration that is based at least in part on the channel state reporting process limit.

An apparatus for wireless communication is described. The apparatus may include means for establishing a CA configuration for a UE, wherein the CA configuration comprises a plurality of CCs, means for receiving an indication of a channel state reporting process limit from the UE, wherein the channel state reporting process limit is based at least in part on a processing capability of the UE and at least one of an antenna configuration or a control channel configuration and means for transmitting a channel state reporting configuration that is based at least in part on the channel state reporting process limit.

A further apparatus is described. The apparatus may include a processor, memory in electronic communication with the processor, and instructions stored in the memory. The instructions may be operable to cause the apparatus to establish a CA configuration for a UE, wherein the CA configuration comprises a plurality of CCs, receive an indication of a channel state reporting process limit from the UE, wherein the channel state reporting process limit is based at least in part on a processing capability of the UE and at least one of an antenna configuration or a control channel configuration and transmit a channel state reporting configuration that is based at least in part on the channel state reporting process limit.

A non-transitory computer readable medium for wireless communication is described. The non-transitory computer-readable medium may include instructions executable to establish a CA configuration for a UE, where the CA configuration comprises a set of CCs, receive an indication of a channel state reporting process limit from the UE, where the channel state reporting process limit is based on a processing capability of the UE and at least one of an antenna configuration or a control channel configuration and transmit a channel state reporting configuration that is based on the channel state reporting process limit.

Some examples of the method, apparatus, or non-transitory computer-readable medium described above may further include processes, features, means, or instructions for identifying a peak number of channel state report processes for a subframe based on the channel state reporting process limit, where the channel state reporting configuration is based on the peak number of channel state report processes for the subframe.

In some examples of the method, apparatus, or non-transitory computer-readable medium described above, the channel state reporting process limit comprises a number of CSI-RS based reports, a number of cell-specific reference signals (CRS) based reports, a number of periodic reports, a number of aperiodic reports, or any combination thereof.

Some examples of the method, apparatus, or non-transitory computer-readable medium described above may further include processes, features, means, or instructions for transmitting a channel state report trigger based on the channel state reporting configuration, where the channel state report trigger indicates a set of subframes for channel state reports.

A method of wireless communication is described. The method may include receiving a trigger for a channel state report in a first subframe, processing the channel state report based at least in part on the trigger, receiving a resource grant for the channel state report in a second subframe and transmitting the channel state report on resources assigned by the resource grant.

An apparatus for wireless communication is described. The apparatus may include means for receiving a trigger for a channel state report in a first subframe, means for processing the channel state report based at least in part on the trigger, means for receiving a resource grant for the channel state report in a second subframe and means for transmitting the channel state report on resources assigned by the resource grant.

A further apparatus is described. The apparatus may include a processor, memory in electronic communication with the processor, and instructions stored in the memory. The instructions may be operable to cause the apparatus to receive a trigger for a channel state report in a first subframe, process the channel state report based at least in part on the trigger, receive a resource grant for the channel state report in a second subframe and transmit the channel state report on resources assigned by the resource grant.

A non-transitory computer readable medium for wireless communication is described. The non-transitory computer-readable medium may include instructions executable to receive a trigger for a channel state report in a first subframe, process the channel state report based on the trigger, receive a resource grant for the channel state report in a second subframe and transmit the channel state report on resources assigned by the resource grant.

Some examples of the method, apparatus, or non-transitory computer-readable medium described above may further include processes, features, means, or instructions for receiving a CSI-RS in the first subframe, where the channel state report is processed using the CSI-RS.

A method of wireless communication is described. The method may include transmitting a trigger for a channel state report in a first subframe, transmitting a resource grant for the channel state report in a second subframe and receiving the channel state report on resources assigned by the resource grant based at least in part on the trigger.

An apparatus for wireless communication is described. The apparatus may include means for transmitting a trigger for a channel state report in a first subframe, means for transmitting a resource grant for the channel state report in a second subframe and means for receiving the channel state report on resources assigned by the resource grant based at least in part on the trigger.

A further apparatus is described. The apparatus may include a processor, memory in electronic communication with the processor, and instructions stored in the memory. The instructions may be operable to cause the apparatus to transmit a trigger for a channel state report in a first subframe, transmit a resource grant for the channel state report in a second subframe and receive the channel state report on resources assigned by the resource grant based at least in part on the trigger.

A non-transitory computer readable medium for wireless communication is described. The non-transitory computer-readable medium may include instructions executable to transmit a trigger for a channel state report in a first subframe, transmit a resource grant for the channel state report in a second subframe and receive the channel state report on resources assigned by the resource grant based on the trigger.

Some examples of the method, apparatus, or non-transitory computer-readable medium described above may further include processes, features, means, or instructions for transmitting a CSI-RS in the first subframe, where the channel state report is processed using the CSI-RS.

DETAILED DESCRIPTION

Figure 1:
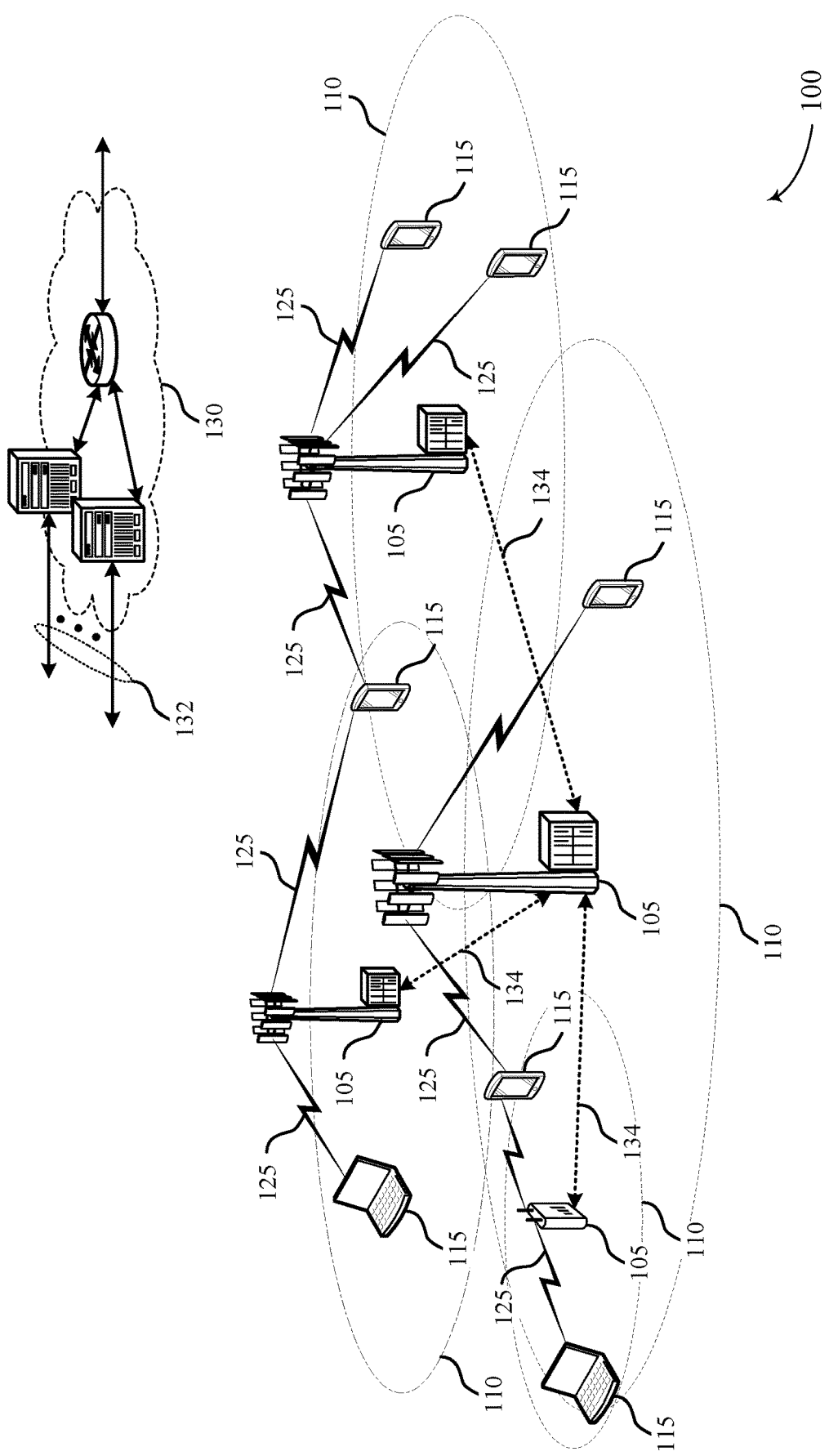
FIG. 1 illustrates an example of a wireless communications system that supports channel state computation for enhanced carrier aggregation (eCA) in accordance with aspects of the present disclosure.

Some wireless communications systems may support communication using multiple component carriers (CCs) in carrier aggregation (CA) or enhanced carrier aggregation (eCA) operation (i.e., operation using a large number of CCs). In such systems, a UE may send a channel state feedback (CSF) report, which may also be referred to as a channel state information (CSI) report, to a base station. The CSF report may provide information about the state of the downlink wireless channel. In some cases, a request for a CSF report may be included in a physical downlink channel (e.g., a physical downlink control channel (PDCCH) or enhanced PDCCH (ePDCCH), etc.) from the base station, which may trigger the transmission of a CSF report by a UE.

In eCA operation, an increased number of CSF processes used to support certain transmission modes may contribute to increased UE computational complexity. In some cases, UE computational complexity may be addressed by a combination of adding more processing elements, making each processing element capable of operating at higher clock speeds, or adding new functionality to processing elements. As a result, these techniques may contribute to additional and more complex hardware, and ultimately, to UE cost. Additional computations by the UE may also result in higher power consumption and reduced battery life.

Limiting the computational complexity for CSF computation and reporting may reduce UE cost and improve battery life. Thus, the number of CSF processes that are reported may be limited (e.g., limited to five processes per subframe or limited based on a total number of processes). In some examples, a UE may signal to the network the maximum number of CSF processes that is capable of supporting.

In some cases, (e.g., for aperiodic reporting), separate triggers for CSF may be sent for each subframe and/or component carrier, with each trigger conforming to the CSF processing limits. Alternatively, a single trigger may be sent that indicates a sequence of reports to happen over a succession of subframes, with each report conforming to the CSF limits. In some examples, a prioritized order of CSF processes may be established through prior signaling between the UE and the network. In the event that the network triggers more processes than the UE's CSF processing limit, the UE may process within its limit according to the prioritized order. Additional processes may use non-current (also referred to as "stale") CSF reports, and may process the current CSF in subsequent subframes.

In some examples, information on which CSF reports are included for a given subframe may be communicated in advance of the time when the report is needed. In some wireless systems, the CSI-RS trigger may be advanced by a single subframe to allow the UE sufficient processing time. The aperiodic trigger may also be advanced by a subframe to allow sufficient time to determine which CSF processes may be computed in each subframe. In some cases, CSF reporting requirements may be set equal to a maximum allowed timing advance. Since a relatively large timing advance may be a relatively infrequent phenomenon, sizing UE complexity may be based on typical cases and rare occurrences may be addressed through special handling. Thus, the reporting standards may be defined for small timing advances. Similarly, the reporting standards may be different for ePDCCH and PDCCH.

Aspects of the disclosure introduced above are described below in the context of a wireless communication system. Examples of CSF processing and reporting timelines are then described. Aspects of the disclosure are further illustrated by and described with reference to apparatus diagrams, system diagrams, and flowcharts that relate to channel state computation in eCA.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support a modified CSI reporting configuration for enhanced carrier aggregation (eCA). For example, wireless communications system 100 may enable a UE 115 to indicate a limit on the number of channel state reporting processes to reduce the computation complexity of processing the reports.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or DL transmissions, from a base station 105 to a UE 115. The communication links 125 may include CSF reports configured and sent based on process limits indicated by a UE 115.

UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 132 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may gather channel state information from a UE 115 in order to efficiently configure and schedule the channel. This information may be sent from the UE 115 in the form of a channel state report. A channel state report may contain an rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as CRS or channel state information reference signal (CSI-RS). RI and PMI may be excluded if the UE 115 does not support spatial multiplexing (or is not in support spatial mode).

The types of information included in the report determines a reporting type. Channel state reports may be periodic or aperiodic. That is, a base station 105 may configure a UE 115 to send periodic reports at regular intervals, and may also request or trigger additional reports as needed. Aperiodic reports may include wideband reports indicating the channel quality across an entire cell bandwidth, UE selected reports indicating a subset of the best subbands, or configured reports in which the subbands reported are selected by the base station 105. As described herein, aperiodic reports in successive subframes may be triggered by a single report in one subframe.

A carrier may also be referred to as a component carrier (CC), a layer, a channel, etc. The term "component carrier" may refer to each of the multiple carriers utilized by a UE in carrier aggregation (CA) operation, and may be distinct from other portions of system bandwidth. Enhanced carrier aggregation (eCA) may include a large number of component carriers (e.g., more than 5, and up to 32). A component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. In eCA, a UE 115 may be configured with five or more CCs, each of which may call for or benefit from CSF.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL CC and a DL CC.

The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

A UE 115 may obtain control information in a physical downlink control channel (PDCCH). PDCCH carries downlink control information (DCI) in control channel elements (CCEs), which may consist of nine logically contiguous resource element (RE) groups (REGs), where each REG contains 4 resource elements (REs). DCI includes information regarding DL scheduling assignments, UL resource grants, transmission scheme, UL power control, hybrid automatic repeat request (HARD) information, MCS and other information. The size and format of the DCI messages can differ depending on the type and amount of information that is carried by the DCI. For example, if spatial multiplexing is supported, the size of the DCI message is large compared to contiguous frequency allocations.

Similarly, for a system that employs multiple input multiple output (MIMO), the DCI must include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the UE, a limited set of CCE locations can be specified for DCI associated with a specific UE 115.

CCEs may be grouped (e.g., in groups of 1, 2, 4 and 8 CCEs), and a set of CCE locations in which the UE may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information (SI), random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power). In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods.

In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.) Flexible bandwidth and variable TTIs may be associated with a modified control channel configuration (e.g., an eCC may utilize an ePDCCH (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

A UE 115 utilizing eCA may identify a limit to the number of channel state processes it is capable of supporting. The UE 115 may transmit this limit to a base station 105, which may configure a channel state reporting configuration, and send channel state reporting triggers according to the indicated limit. In some cases, a single trigger may correspond to reports covering multiple subframes and/or component carriers. The base station 105 may also arrange the channel state reporting configuration to reduce the peak number of channel state reports that the UE 115 processes during each subframe. In some cases, the UE 115 may determine that a number of channel state processes needed to perform the channel state reporting in a subframe exceeds its capacity. The UE 115 may then prioritize the channel state processes and, in some cases, transmit a non-current report.

Figure 2:
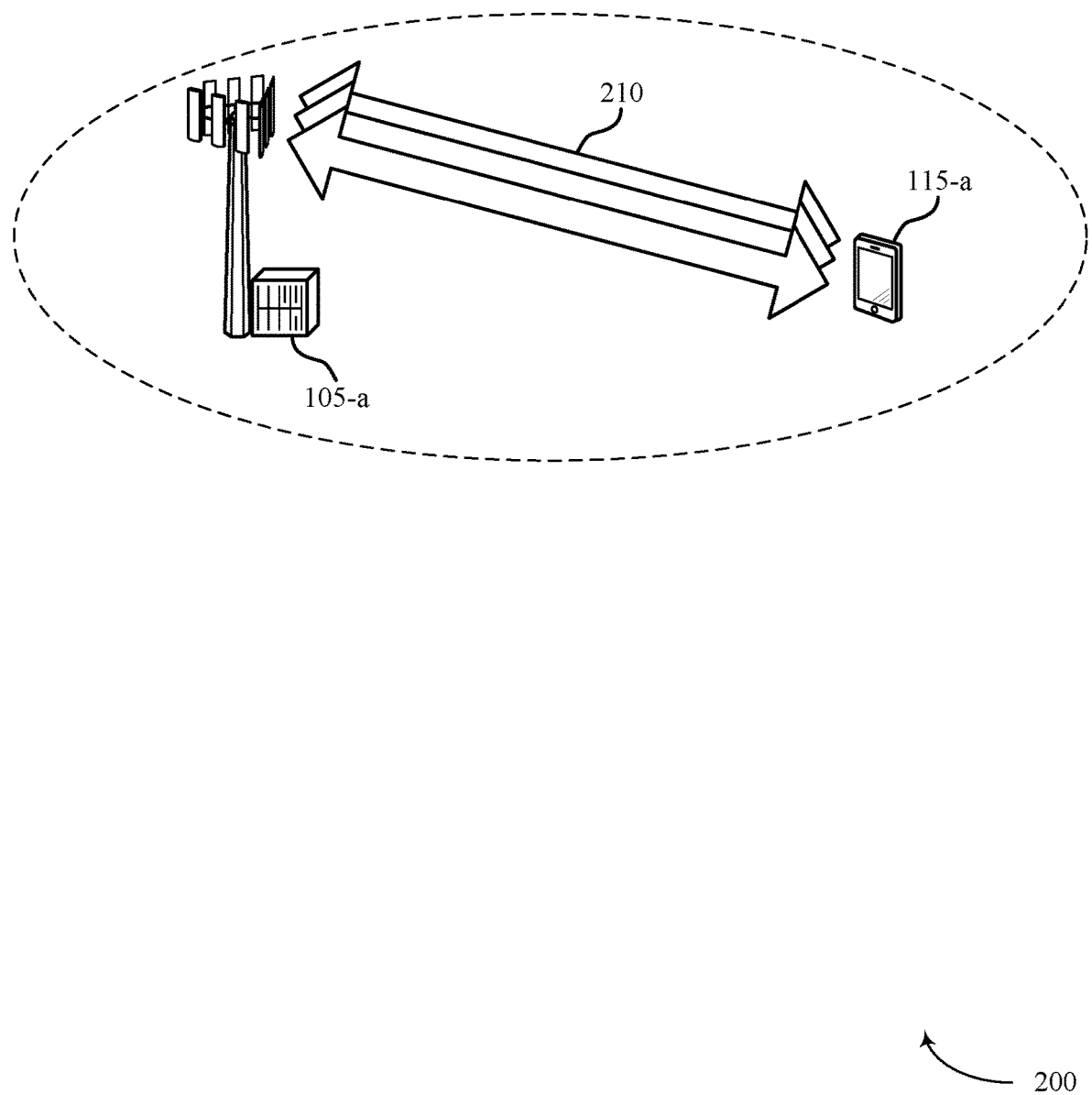
FIG. 2 illustrates an example of a wireless communications system that supports channel state computation for eCA in accordance with aspects of the present disclosure.

FIG. 2 illustrates an example of a wireless communications system 200 for channel state computation in eCA.

Wireless communications system 200 may include base station 105-a and UE 115-a, which may be examples of the corresponding devices described with reference to FIG. 1. Wireless communications system 200 may support a modified CSI reporting configuration. For example, wireless communications system 200 may enable a UE 115 to indicate a limit on the number of channel state reporting processes to reduce the computation complexity of processing the reports.

UE 115-a may send CSF reports to a base station 105-a describing the state of the downlink wireless channel. In some cases, a CSF request may be included in a physical downlink channel 210 (e.g., a PDCCH or ePDCCH, etc.) from the base station 105-a, which may trigger the transmission of a CSF report by UE 115-a. CSF reporting may be divided into periodic and aperiodic categories, and may also be continuously computed by UE 115-a for all processes in a communication (e.g., processes that are cell specific reference signal (CRS)-based, channel state information reference signal (CSI-RS) based, periodic, aperiodic, etc.). The complexity of computing CSF may be a function of system and UE parameters, such as the number of transmit (Tx) ports and reception (Rx) antennas, and the limit on the number of processes configured for UE 115-a may be different for different numbers of Tx and Rx antennas.

In some cases, the number of CSF processes that are reported in one subframe may be limited by UE 115-a (e.g., limited to five processes). In some examples, UE 115-a may signal to the network the maximum number of CSF processes that it can support. For example, in five-way CA or eCA communications, UE 115-a may signal that it can be configured for up to (4, 4, 4, 1, 1) processes on carriers numbered (1, 2, 3, 4, 5), respectively, and different numbers may be used for ePDCCH and PDCCH transmissions. In some cases, the number of subframes between an aperiodic channel quality indication (CQI) request and the time to send the CSF report may be increased, such as with ePDCCH, for example.

In some cases, the limits on CSF computation and reporting may be related to the number of processes in a single subframe. For example, CSI-RS processes may be configured with a certain periodicity (e.g., 5 ms or greater), and limits on the configuration of CSF reporting may be translated into a reduced peak processing limit. For example, the processing load in any given subframe may be a fraction (e.g., ⅕th) of the total configured CSF computational load. In some cases, the limit may include reports for both periodic and aperiodic reporting, and may include both CSI-RS based as well as CRS based reports for configured component carriers.

For aperiodic reporting, separate triggers may be sent for each subframe and component carrier, with each trigger conforming to the CSF processing limits. Alternatively, a single trigger may be sent that indicates a sequence of reports to happen over a succession of subframes, with each report conforming to the CSF limits. In some examples, a prioritized order of CSF processes may be established between UE 115-a and base station 105-a. In the event that the network triggers more processes than the CSF processing limit, UE 115-a may process within its limit according to the prioritized order. Additional processes may use non-current CSF information, and UE 115-a may process the current CSF in subsequent subframes.

In some examples, information on which CSF reports are included for a given subframe may be communicated in advance of the time when the report is needed. For example, the CSI-RS may be advanced by a single subframe to allow UE 115-a sufficient processing time. In some examples, the aperiodic trigger (e.g., DCI0) may also be advanced by a subframe to allow sufficient time to determine which CSF processes may be computed in each subframe. In some cases, CSF reporting requirements may be set equal to a maximum timing advance. Reporting standards may be different for ePDCCH and PDCCH, for example.

Figure 3:
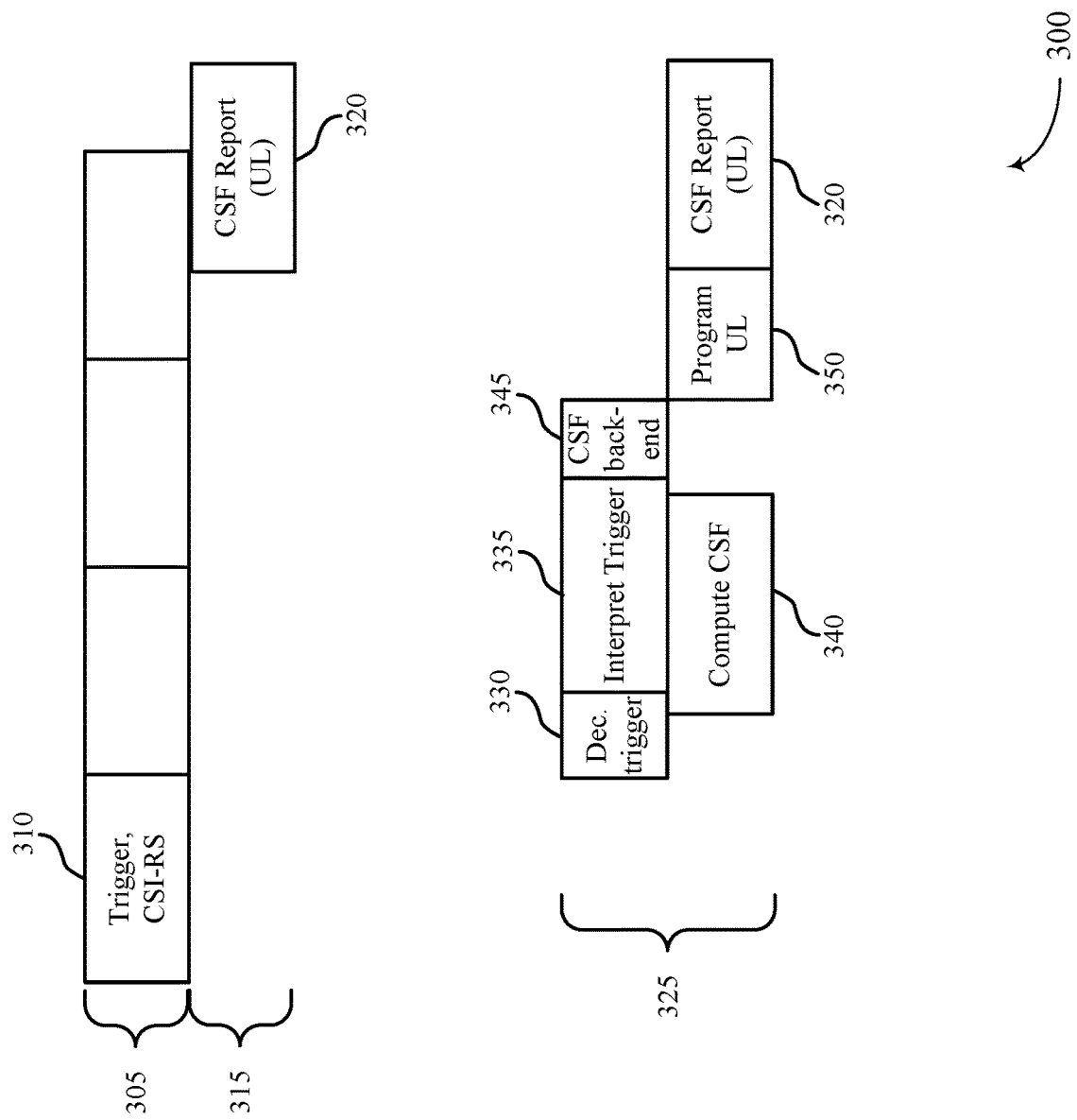
FIG. 3 illustrates an example of channel state feedback (CSF) processing for eCA in accordance with aspects of the present disclosure.

FIG. 3 illustrates an example of a CSF processing timeline 300 for channel state feedback in eCA. CSF processing timeline 300 may illustrate techniques performed by a UE 115 or base station 105 as described with reference to FIGS. 1-2. CSF processing timeline 300 may be illustrative of processing a CSF report when a downlink transmission includes both a reference signal and reporting trigger in a single downlink subframe 310.

A base station 105 may transmit on a downlink channel 305 to a UE 115. The downlink channel 305 may include a downlink subframe 310 that includes a trigger for a channel state report and a CSI-RS. Thus, in response to the trigger, a UE 115 may use an uplink channel 315 to return a CSF report 320 to the base station 105 to report the state of the downlink channel 305. The base station 105 may determine when to request reports, and thus when to send the trigger based on information provided by the UE 115 regarding the UE's 115 channel state reporting process capability. For example, the UE 115 may determine its capability based on transmit antenna ports or available receive antennas.

The UE 115 may process the CSF report—e.g., evaluate channel conditions, compare measurements, etc. and prepare a report—using CSF processing timeline 325. For example, the UE 115 may receive a downlink subframe 310, and at process 330, decode the trigger requesting CSF. The UE 115 may then interpret the trigger at process 335 and may simultaneously compute the CSF at process 340. Subsequently the UE 115 may perform the CSF backend operations at process 345. Upon the completion of the CSF report, the UE 115 may program an uplink transmission at process 350 and may transmit, via the uplink channel 315, the CSF report 320 to the base station 105.

Figure 4:
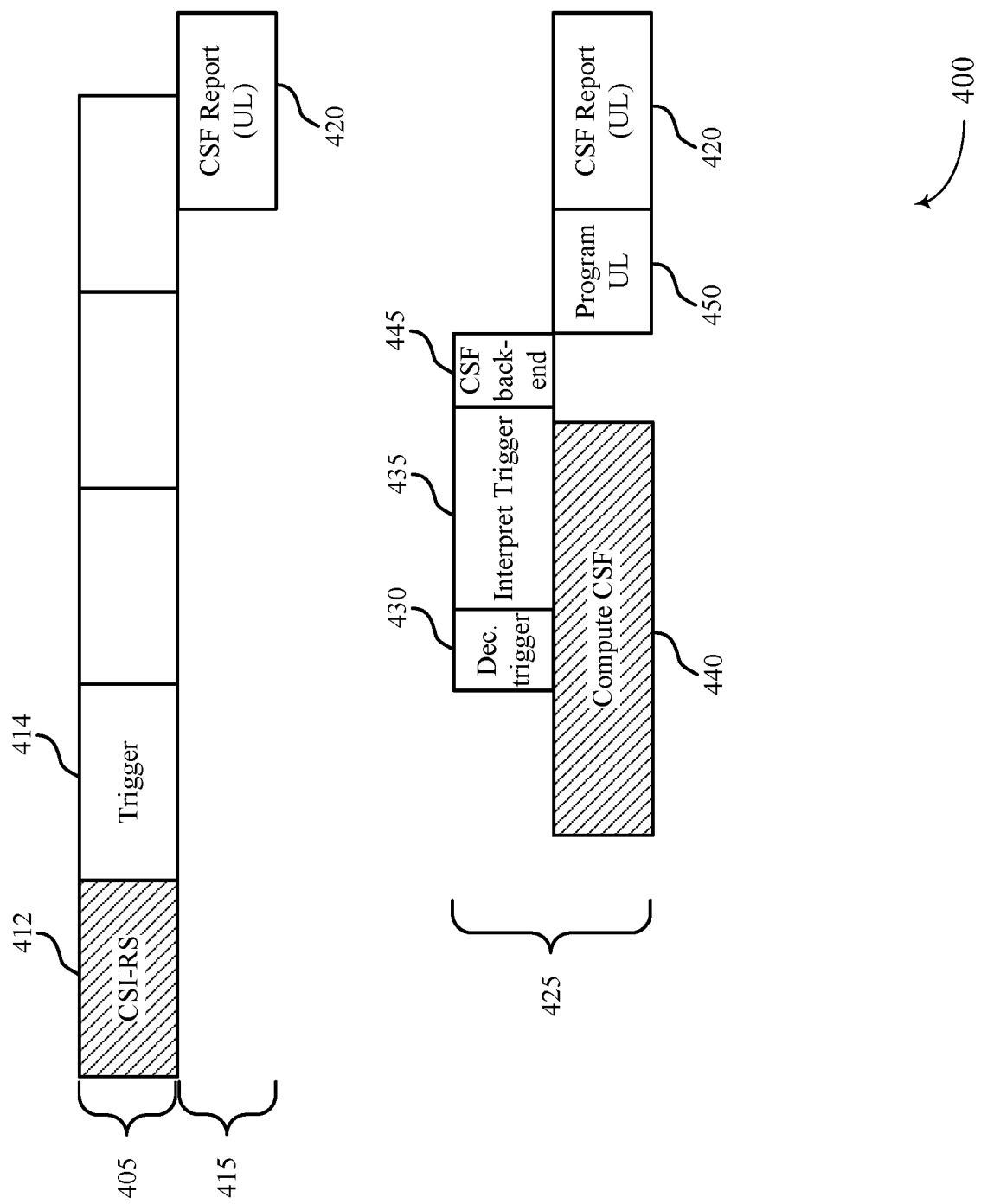
FIG. 4 illustrates another example of CSF processing for eCA in accordance with aspects of the present disclosure.

FIG. 4 illustrates another example of a CSF processing 400 in eCA. In some cases, CSF processing 400 may illustrate techniques performed by a UE 115 or base station 105 as described with reference to FIGS. 1-2. In some cases, CSF processing 400 may be an example of processing a CSF report when a downlink transmission may include separate reference and trigger subframes.

A base station 105 may transmit on a downlink channel 405 to a UE 115. The downlink channel 405 may include a reference signal subframe 412 that include a CSI-RS and a subsequent trigger subframe 414 that includes a trigger for a channel state report. In response to the trigger, a UE 115 may use an uplink channel 415 to return a CSF report 420 to the base station 105 to report the state of the downlink channel 405. The base station 105 may determine when to request reports, and thus when to send the trigger, based on information provided by the UE 115 regarding the UE's 115 channel state reporting process capability. For example, the UE 115 may determine its capability based on transmit antenna ports or available receive antennas.

The UE 115 may process the CSF report using CSF processing configuration 425. For example, the UE 115 may receive the reference signal subframe 412, and at process 440 may compute CSF based on the CSI-RS included in the reference signal subframe 412. Upon receipt of the subsequent trigger subframe 414, the UE 115 may decode the trigger information at process 430, interpret the trigger information at process 435, and complete CSF backend operations at process 445. Upon the completion of the CSF report, the UE 115 may program an uplink transmission at process 450, and transmit the CSF report 420 to the base station.

Figure 5:
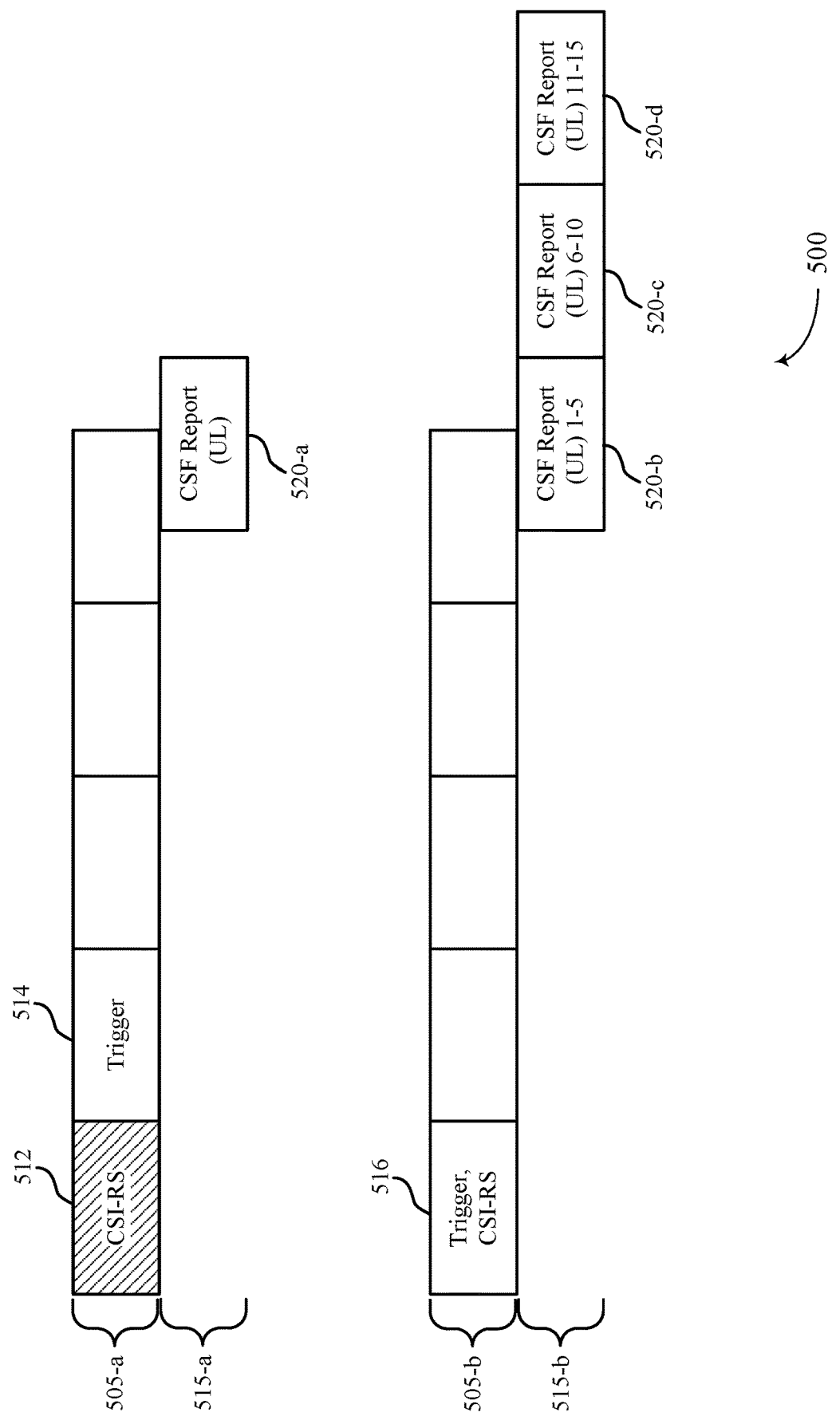
FIG. 5 illustrates an example of CSF reporting for eCA in accordance with aspects of the present disclosure.

FIG. 5 illustrates an example of a CSF reporting 500 in eCA. In some cases, CSF reporting 500 may illustrate techniques performed by a UE 115 or base station 105 as described with reference to FIGS. 1-2. CSF reporting 500 shows transmitting CSF reports in multiple subframes according to an eCA configuration.

A base station 105 may transmit on a downlink channel 505-*b* to a UE 115. The downlink channel 505-*a* may include a reference signal subframe 512 that include a CSI-RS and a subsequent trigger subframe 514 that includes a trigger for a channel state report. Responsive to the trigger, a UE 115 may use an uplink channel 515-*a* to return a single CSF report 520-*a* to the base station 105 to report the state of the downlink channel 505-*a*. The base station 105 may determine when to request reports, and thus when to send the trigger based on information provided by the UE 115 regarding the UE's 115 channel state reporting process capability. For example, the UE 115 may determine its capability based on transmit antenna ports or available receive antennas.

Additionally or alternatively, a base station 105 may transmit on a downlink channel 505-*b* to a UE 115 that includes a downlink subframe 516 with a trigger for channel state reporting and a CSI-RS. In some examples, a UE may transmit on an uplink channel 515-*b* multiple subframes that provide a CSF report. That is, a UE may limit the number of processes in one CSF report subframe. For example, a first CSF report 520-*b* may include processes 1-5, a second CSF report 520-*c* may include processes 6-10, and a third CSF report 520-*d* may include the final processes 11-15. The CSF processes may be CRS-based, CSI-RS based, aperiodic, or periodic.

Figure 6:
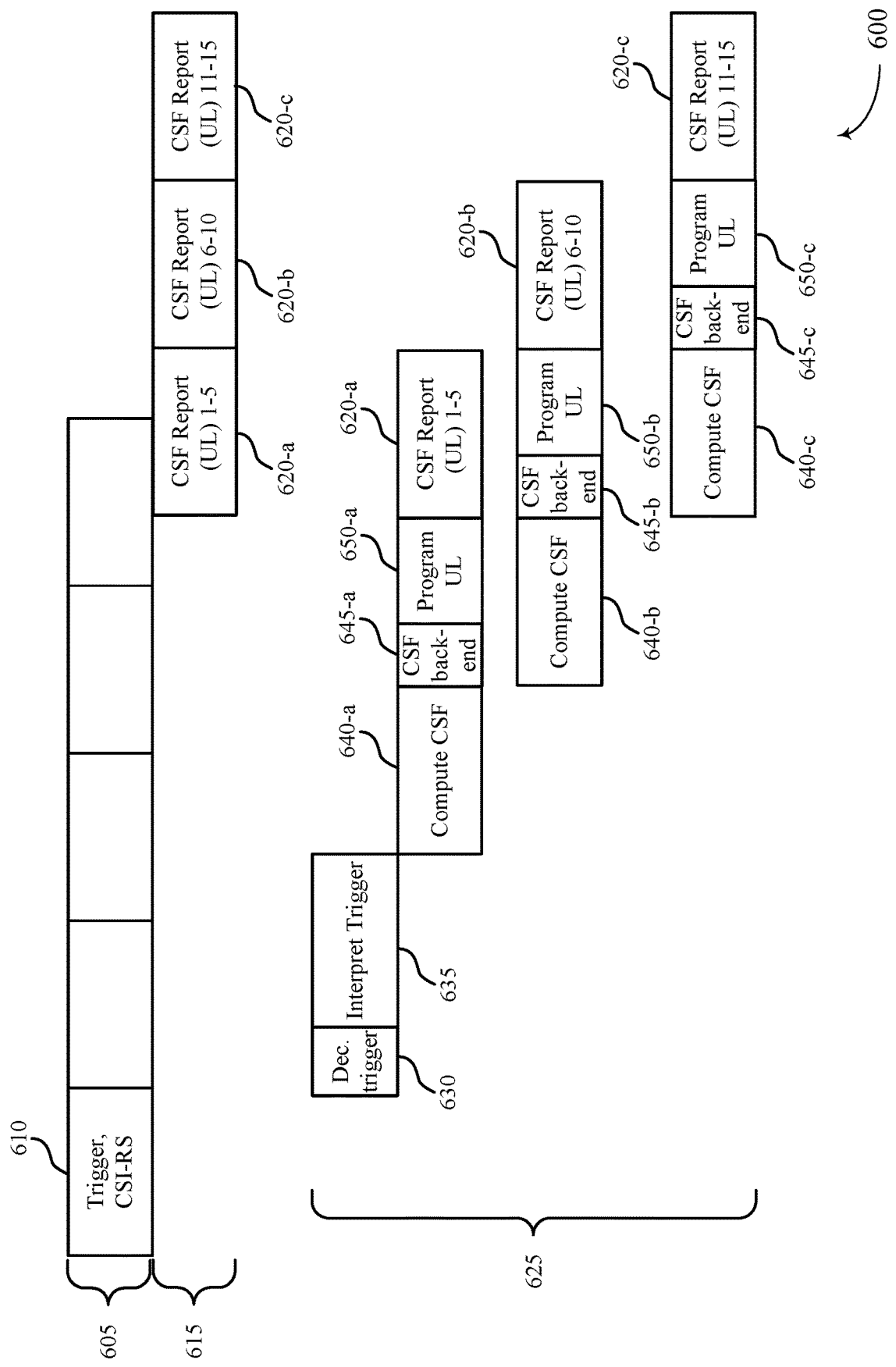
FIG. 6 illustrates an example of CSF processing for eCA in accordance with aspects of the present disclosure.

FIG. 6 illustrates another example of CSF processing 600 in eCA. In some cases, CSF configuration 600 may illustrate techniques performed by a UE 115 or base station 105 as described with reference to FIGS. 1-2. In some examples, a CSF processing configuration may allow for the transmission of one or more subframes that include a CSF report, where each CSF report may include a limited number of processes.

A base station 105 may transmit a downlink channel 605 to a UE 115 that includes a downlink subframe 610 with a trigger for channel state reporting and a CSI-RS. In some examples, a UE 115 may transmit on an uplink channel 615 multiple subframes that provide a CSF report. That is, the UE 115 may limit the number of processes in one CSF report subframe, where each of CSF reports 620-*a* through 620-*c* may include a limited number of processes, as mentioned above.

The UE 115 may return a CSF report to the base station 105 according to CSF processing configuration 625. For example, following the receipt of the trigger for a channel state report and CSI-RS in the downlink subframe 610, the UE may decode the trigger information at process 630 and interpret the trigger information at process 635. At process 640-*a*, the UE 115 may subsequently compute CSF for a first set of a limited number of processes (e.g., processes 1-5). Based on the computed CSF for the limited number of processes, the UE 115 may complete CSF backend operations at process 645-*a*, program the uplink transmission at process 650-*a*, and transmit the CSF report 620-*a*, including the first set of limited number of processes, via the uplink channel 615.

Following the computation of CSF at process 640-*a*, the UE 115 may begin a second iteration of computing CSF at process 640-*b*, where the second CSF may include a second set of a limited number of processes (e.g., processes 6-10). Subsequent to the computation, the UE 115 may perform CSF backend operations at process 645-*b*, program uplink transmission at process 650-*b*, and transmit the CSF report 620-*b* including the second set of a limited number of processes.

Similarly, a third iteration of the CSF computation may be completed by the UE. For example, the UE 115 may compute CSF at process 640-*c* for a third set of a limited number of processes (e.g., processes 11-15). As mentioned above, the UE 115 may complete the CSF backend operations at process 645-*c*, program the uplink transmission at process 650-*c*, and transmit the CSF report 620-*c* that includes the third set of the limited number of processes.

Figure 7:
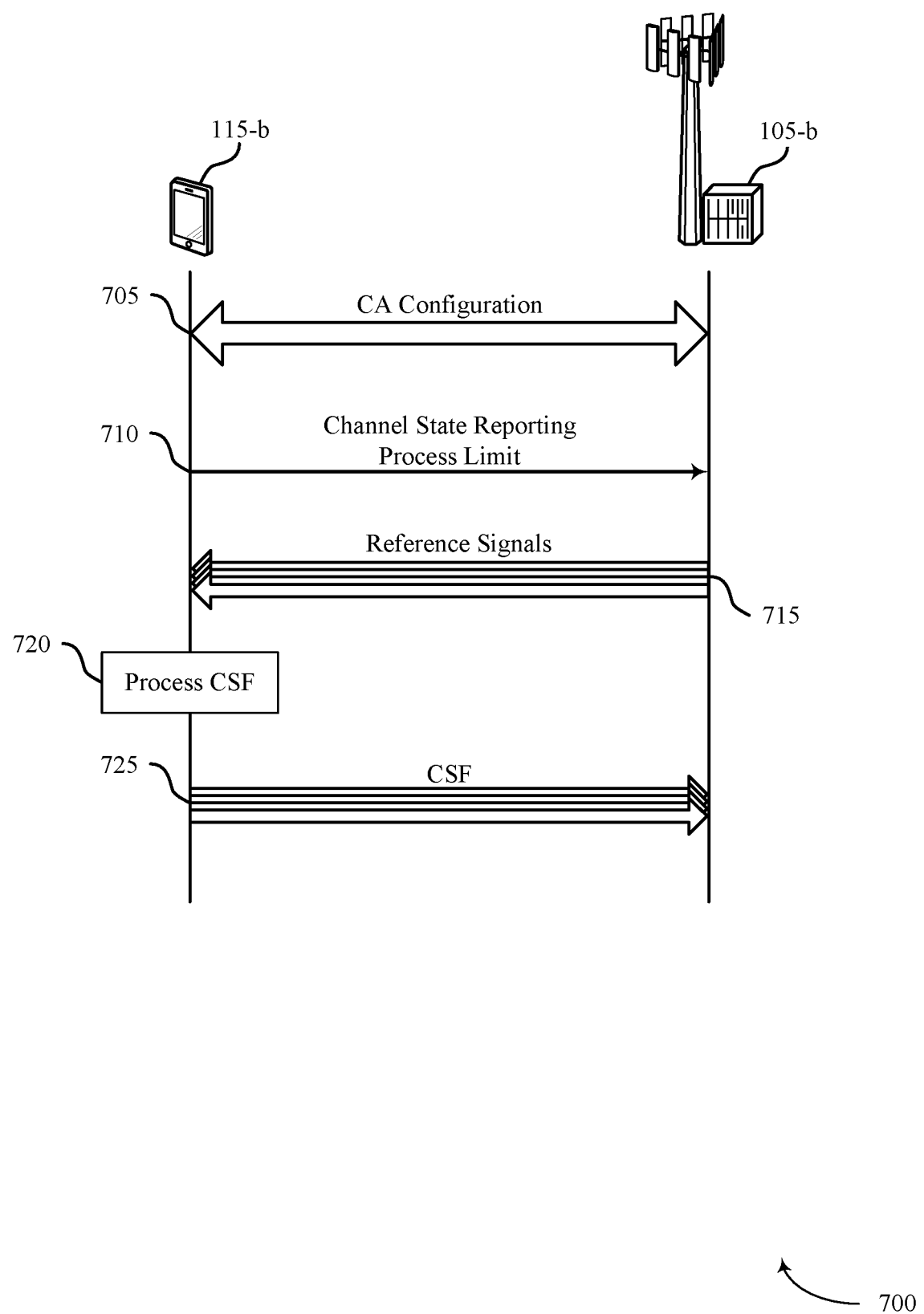
FIG. 7 illustrates an example of a process flow in a system that supports channel state computation for eCA in accordance with aspects of the present disclosure.

FIG. 7 illustrates an example of a process flow 700 for channel state computation in eCA in accordance with various aspects of the present disclosure. Process flow 700 may include base station 105-*a* and UE 115-*a*, which may be examples of the corresponding devices described with reference to FIG. 1-2.

At step 705, UE 115-*b* and base station 105-*b* may establish a CA configuration, where the configuration may include multiple CCs. In some cases, the CA configuration includes a large number of CCs (e.g., greater than five) in an eCA configuration.

At step 710, UE 115-*b* may identify a channel state reporting process limit associated with the CA configuration based on a processing capability and at least one of an antenna configuration or a control channel configuration and transmit an indication of the channel state reporting process limit to base station 105-*b*. In some cases, UE 115-*b* may transmit an indication of the antenna configuration to the base station, where the antenna configuration may include a number of receive antennas and the channel state reporting process limit is identified based on the number of receive antennas. The control channel configuration may include a PDCCH and the channel state reporting process limit is identified based on receiving DL signaling in the PDCCH.

In some cases, the control channel configuration includes an enhanced physical downlink control channel ePDCCH and the channel state reporting process limit is identified based on receiving DL signaling in the ePDCCH. In some examples, the indication may include a number of channel state processes for each CC of the plurality of CCs. In some cases, base station 105-*b* may identify a peak number of channel state report processes for a subframe based on the channel state reporting process limit, where the channel state reporting configuration is based on the peak number of channel state report processes for the subframe. The channel state reporting process limit may include or be associated with a number of CSI-RS based reports, a number of CRS based reports, a number of periodic reports, a number of aperiodic reports, or the like.

At step 715, UE 115-*b* may receive a trigger for a channel state report from base station 105-*b*. In some cases, base station 105-*b* may transmit, and UE 115-*b* may receive, a channel state reporting configuration that is based on the channel state reporting process limit. In some cases, base station 105-*b* may transmit, and UE 115-*b* may receive, a trigger for a channel state report in a first subframe, a resource grant for the channel state report in a second subframe, and UE 115-*b* may receive the channel state report on resources assigned by the resource grant based on the trigger. In some examples, base station 105-*b* may transmit, and UE 115-*b* may receive, CSI-RS in the first subframe.

At step 720, UE 115-*b* may process the channel state report. In some cases, the channel state report may be processed using CSI-RS received in the first subframe.

At step 725, UE 115-*b* may transmit, and base station 105-*b* may receive, one or more channel state reports according to the channel state reporting process limit. In some examples, UE 115-*b* may transmit a first channel state report in a first subframe based on the trigger for the channel state report and transmit a second channel state report in a second subframe based on the trigger for the channel state report. In some cases, UE 115-*b* may determine that a number of channel state reports associated with the trigger exceeds a threshold and transmit a non-current channel state report during the subframe based on the determination, where the non-current channel state report is associated with a previous trigger.

In some cases, UE 115-*b* may determine that a number of channel state reports exceeds the channel state reporting process limit and may prioritize the one or more channel state reports based on the channel state reporting process limit, where the one or more channel state reports are transmitted according to the prioritization.

Figure 8:
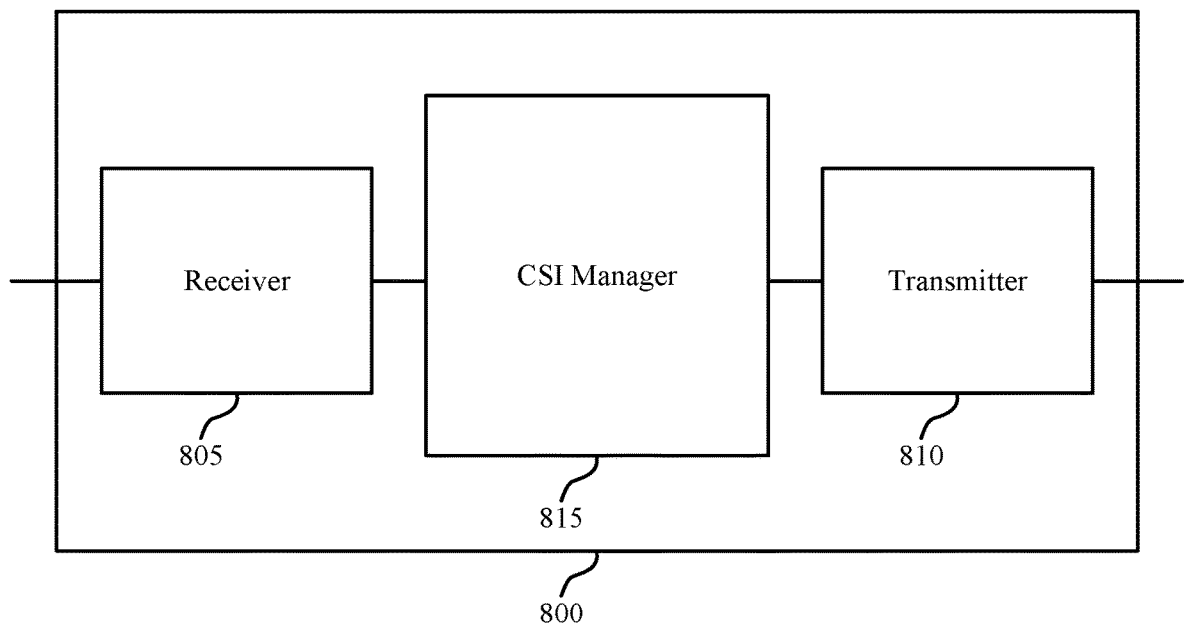
FIGS. 8 through 10 show block diagrams of a wireless device or devices that support channel state feedback processing for eCA in accordance with aspects of the present disclosure.

FIG. 8 shows a block diagram of a wireless device 800 that supports channel state computation in eCA in accordance with various aspects of the present disclosure. Wireless device 800 may be an example of aspects of a UE 115 described with reference to FIGS. 1 and 2. Wireless device 800 may include receiver 805, transmitter 810 and CSI manager 815. Wireless device 800 may also include a processor. Each of these components may be in communication with each other.

The receiver 805 may receive information such as packets, user data, or control information associated with various information channels (e.g., control channels, data channels, and information related to channel state computation in eCA, etc.). Information may be passed on to other components of the device. The receiver 805 may be an example of aspects of the transceiver 1125 described with reference to FIG. 11.

The transmitter 810 may transmit signals received from other components of wireless device 800. In some examples, the transmitter 810 may be collocated with a receiver in a transceiver module. For example, the transmitter 810 may be an example of aspects of the transceiver 1125 described with reference to FIG. 11. The transmitter 810 may include a single antenna, or it may include a plurality of antennas.

The CSI manager 815 may receive a trigger for a channel state report from a base station, transmit a first channel state report in a first subframe based on the trigger for the channel state report, and transmit a second channel state report in a second subframe based on the trigger for the channel state report.

The CSI manager 815 may also receive a trigger for a channel state report in a first subframe, process the channel state report based on the trigger, receive a resource grant for the channel state report in a second subframe, and transmit the channel state report on resources assigned by the resource grant. The CSI manager 815 may be an example of aspects of the CSI manager 1105 described with reference to FIG. 11.

Figure 9:
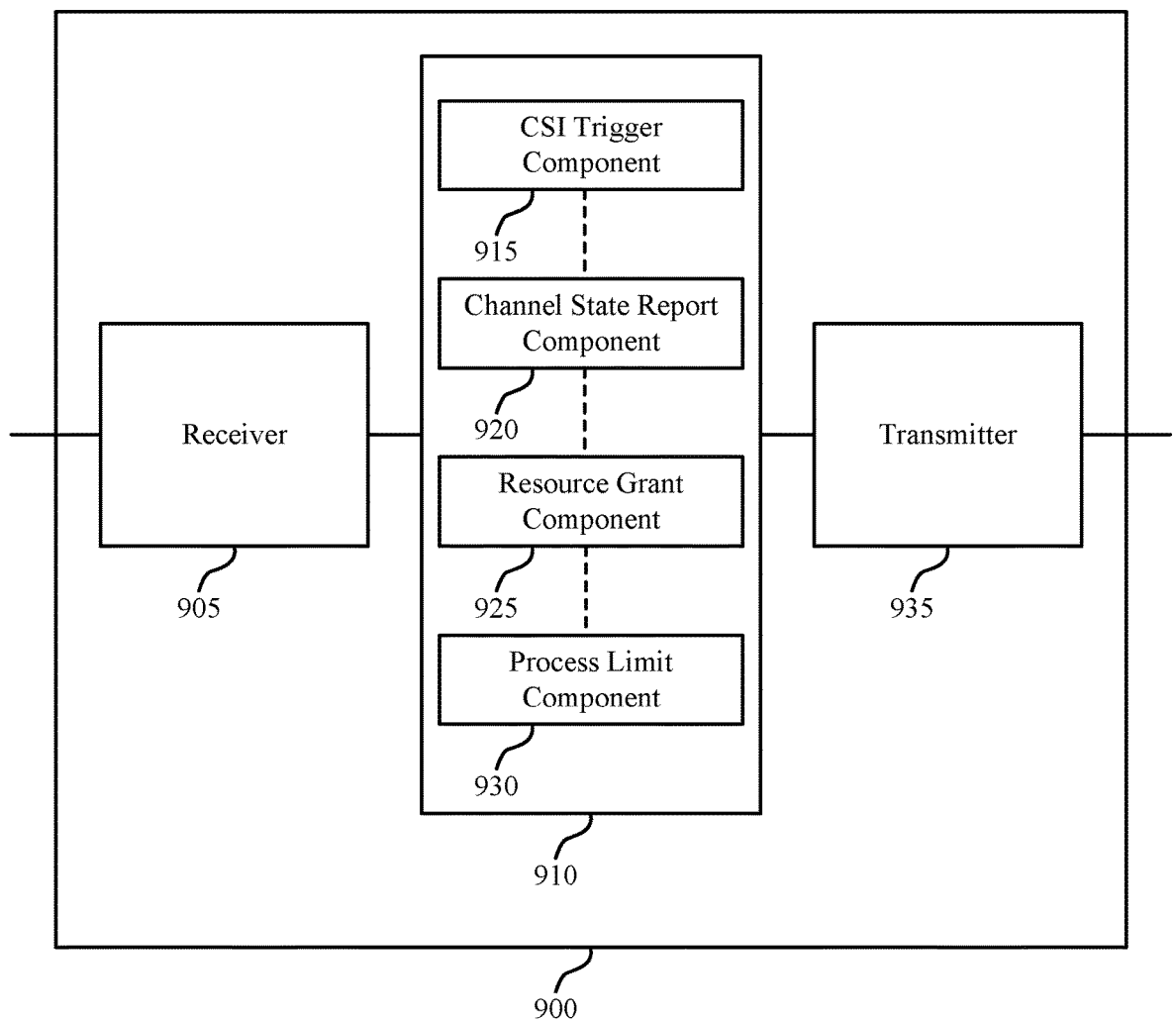

FIG. 9 shows a block diagram of a wireless device 900 that supports channel state computation in eCA in accordance with various aspects of the present disclosure. Wireless device 900 may be an example of aspects of a wireless device 800 or a UE 115 described with reference to FIGS. 1, 2 and 8. Wireless device 900 may include receiver 905, CSI manager 910 and transmitter 935. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The CSI manager 910 may be an example of aspects of CSI manager 815 described with reference to FIG. 8. The CSI manager 910 may include CSI trigger component 915, channel state report component 920, resource grant component 925 and process limit component 930. The CSI manager 910 may be an example of aspects of the CSI manager 1105 described with reference to FIG. 11.

The CSI trigger component 915 may receive a trigger for a channel state report from a base station, and receive a trigger for a channel state report in a first subframe.

The channel state report component 920 may prioritize the one or more channel state reports based on the channel state reporting process limit, and the one or more channel state reports may be transmitted according to the prioritization, transmit a first channel state report in a first subframe based on the trigger for the channel state report, and transmit a second channel state report in a second subframe based on the trigger for the channel state report.

The channel state report component 920 may also transmit a non-current channel state report during the subframe based on the determination, and the non-current channel state report may be associated with a previous trigger, process the channel state report based on the trigger, transmit the channel state report on resources assigned by the resource grant, and transmit one or more channel state reports to the base station according to the channel state reporting process limit.

The resource grant component 925 may receive a resource grant for the channel state report in a second subframe.

The process limit component 930 may determine that a number of channel state reports exceeds the channel state reporting process limit, determine that a number of channel state reports associated with the trigger exceeds a threshold, identify a channel state reporting process limit associated with the carrier aggregation configuration based on a processing capability and at least one of an antenna configuration or a control channel configuration, and transmit an indication of the channel state reporting process limit to a base station.

In some cases, the control channel configuration includes a physical downlink control channel and the channel state reporting process limit is identified based on receiving downlink signaling in the physical downlink control channel. In some cases, the control channel configuration includes an enhanced physical downlink control channel and the channel state reporting process limit is identified based on receiving downlink signaling in the enhanced physical downlink control channel. In some cases, the indication includes a number of channel state processes for each component carrier of the plurality of component carriers.

The transmitter 935 may transmit signals received from other components of wireless device 900. In some examples, the transmitter 935 may be collocated with a receiver in a transceiver module. For example, the transmitter 935 may be an example of aspects of the transceiver 1125 described with reference to FIG. 11. The transmitter 935 may utilize a single antenna, or it may utilize a plurality of antennas.

Figure 10:
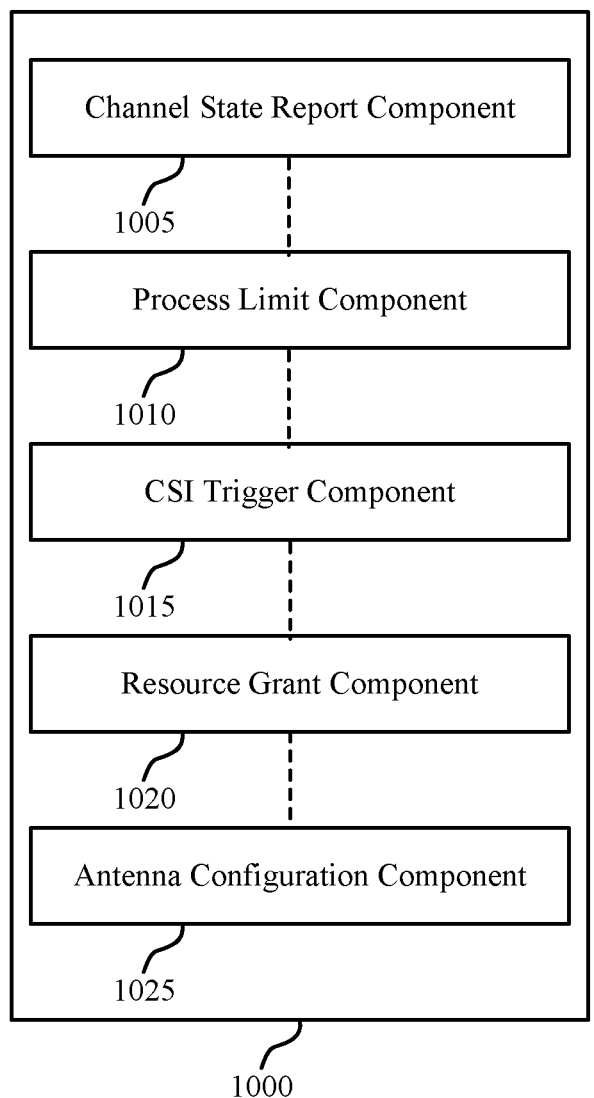

FIG. 10 shows a block diagram of a CSI manager 1000 which may be an example of the corresponding component of wireless device 800 or wireless device 900. That is, CSI manager 1000 may be an example of aspects of CSI manager 815 or CSI manager 910 described with reference to FIGS. 8 and 9. The CSI manager 1000 may also be an example of aspects of the CSI manager 1105 described with reference to FIG. 11.

The CSI manager 1000 may include channel state report component 1005, process limit component 1010, CSI trigger component 1015, resource grant component 1020 and antenna configuration component 1025. Each of these modules may communicate, directly or indirectly, with one another (e.g., via one or more buses).

The channel state report component 1005 may prioritize the one or more channel state reports based on the channel state reporting process limit, and the one or more channel state reports may be transmitted according to the prioritization, transmit a first channel state report in a first subframe based on the trigger for the channel state report, and transmit a second channel state report in a second subframe based on the trigger for the channel state report.

The channel state report component 1005 may also transmit a non-current channel state report during the subframe based on the determination, and the non-current channel state report may be associated with a previous trigger, process the channel state report based on the trigger, transmit the channel state report on resources assigned by the resource grant, and transmit one or more channel state reports to the base station according to the channel state reporting process limit.

The process limit component 1010 may determine that a number of channel state reports exceeds the channel state reporting process limit, determine that a number of channel state reports associated with the trigger exceeds a threshold, identify a channel state reporting process limit associated with the carrier aggregation configuration based on a processing capability and at least one of an antenna configuration or a control channel configuration, and transmit an indication of the channel state reporting process limit to a base station.

The CSI trigger component 1015 may receive a trigger for a channel state report from a base station, and receive a trigger for a channel state report in a first subframe. The resource grant component 1020 may receive a resource grant for the channel state report in a second subframe. The antenna configuration component 1025 may transmit an indication of the antenna configuration to the base station.

Figure 11:
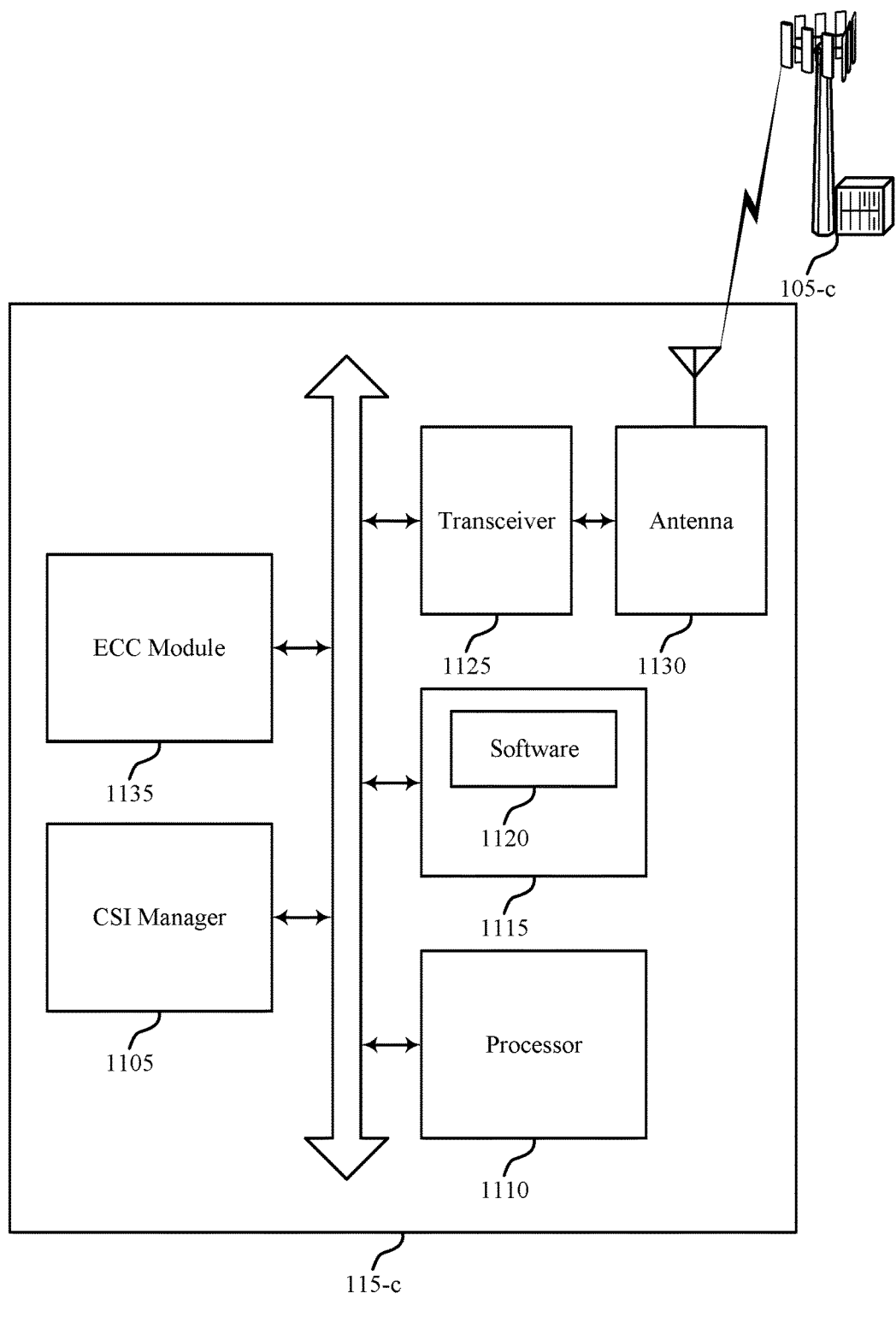
FIG. 11 illustrates a block diagram of a system including a UE that supports channel state feedback for eCA in accordance with aspects of the present disclosure.

FIG. 11 shows a diagram of a system 1100 including a device that supports channel state computation in eCA in accordance with various aspects of the present disclosure. For example, system 1100 may include UE 115-c, which may be an example of a wireless device 800, a wireless device 900, or a UE 115 as described with reference to FIGS. 1, 2 and 8 through 10. UE 115-c may also include CSI manager 1105, processor 1110, memory 1115, transceiver 1125, antenna 1130 and ECC module 1135. Each of these modules may communicate, directly or indirectly, with one another (e.g., via one or more buses). The CSI manager 1105 may be an example of a CSI manager as described with reference to FIGS. 8 through 10.

The processor 1110 may include an intelligent hardware device, (e.g., a central processing unit (CPU), a microcontroller, an application specific integrated circuit (ASIC), etc.) The memory 1115 may include random access memory (RAM) and read only memory (ROM). The memory 1115 may store computer-readable, computer-executable software including instructions that, when executed, cause the processor and thus UE 115-c to perform various functions described herein (e.g., channel state computation in eCA, etc.). In some cases, the software 1120 may not be directly executable by the processor but may cause a computer (e.g., when compiled and executed) to perform functions described herein.

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions.

The ECC module 1135 may enable operations using enhanced component carriers (ECCs) such as communication using shared or unlicensed spectrum, using reduced TTIs or subframe durations, or using a large number of component carriers.

Figure 12:
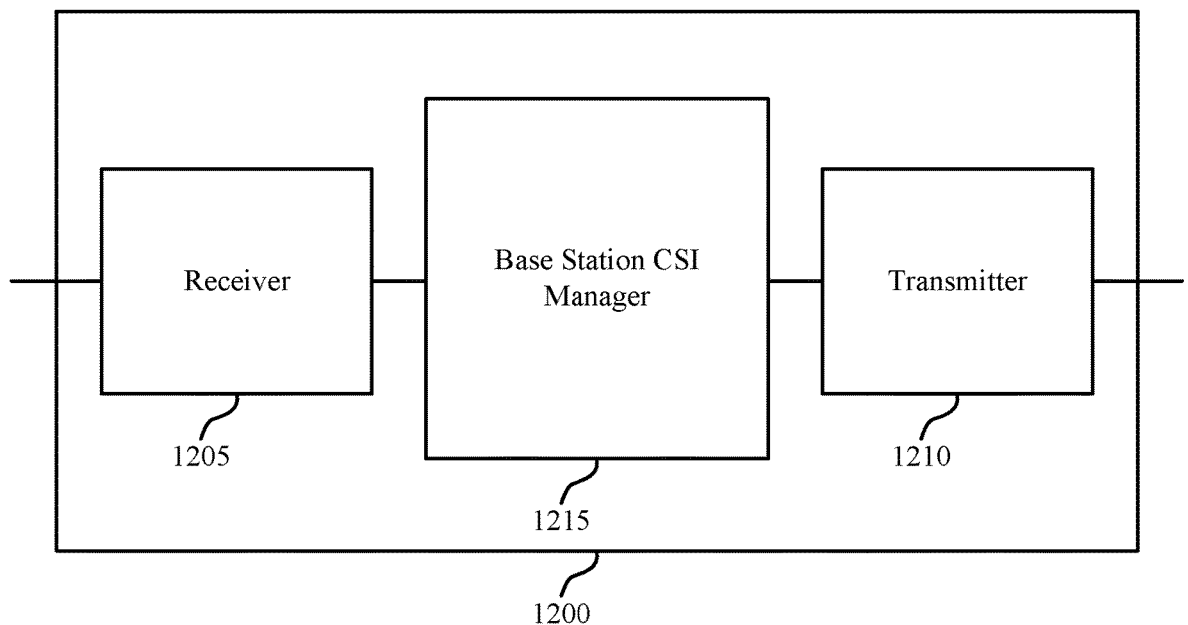
FIGS. 12 through 14 show block diagrams of a wireless device or devices that supports channel state feedback for eCA in accordance with aspects of the present disclosure.

FIG. 12 shows a block diagram of a wireless device 1200 that supports channel state computation in eCA in accordance with various aspects of the present disclosure. Wireless device 1200 may be an example of aspects of a base station 105 described with reference to FIGS. 1 and 2. Wireless device 1200 may include receiver 1205, transmitter 1210 and CSI manager 1215. Wireless device 1200 may also include a processor. Each of these components may be in communication with each other.

The receiver 1205 may receive information such as packets, user data, or control information associated with various information channels (e.g., control channels, data channels, and information related to channel state computation in eCA, etc.). Information may be passed on to other components of the device. The receiver 1205 may be an example of aspects of the transceiver 1525 described with reference to FIG. 15.

The transmitter 1210 may transmit signals received from other components of wireless device 1200. In some examples, the transmitter 1210 may be collocated with a receiver in a transceiver module. For example, the transmitter 1210 may be an example of aspects of the transceiver 1525 described with reference to FIG. 15. The transmitter 1210 may include a single antenna, or it may include a plurality of antennas.

The CSI manager 1215 may transmit a trigger for a channel state report in a first subframe, transmit a resource grant for the channel state report in a second subframe, and receive the channel state report on resources assigned by the resource grant based on the trigger. The CSI manager 1215 may also be an example of aspects of the CSI manager 1505 described with reference to FIG. 15.

Figure 13:
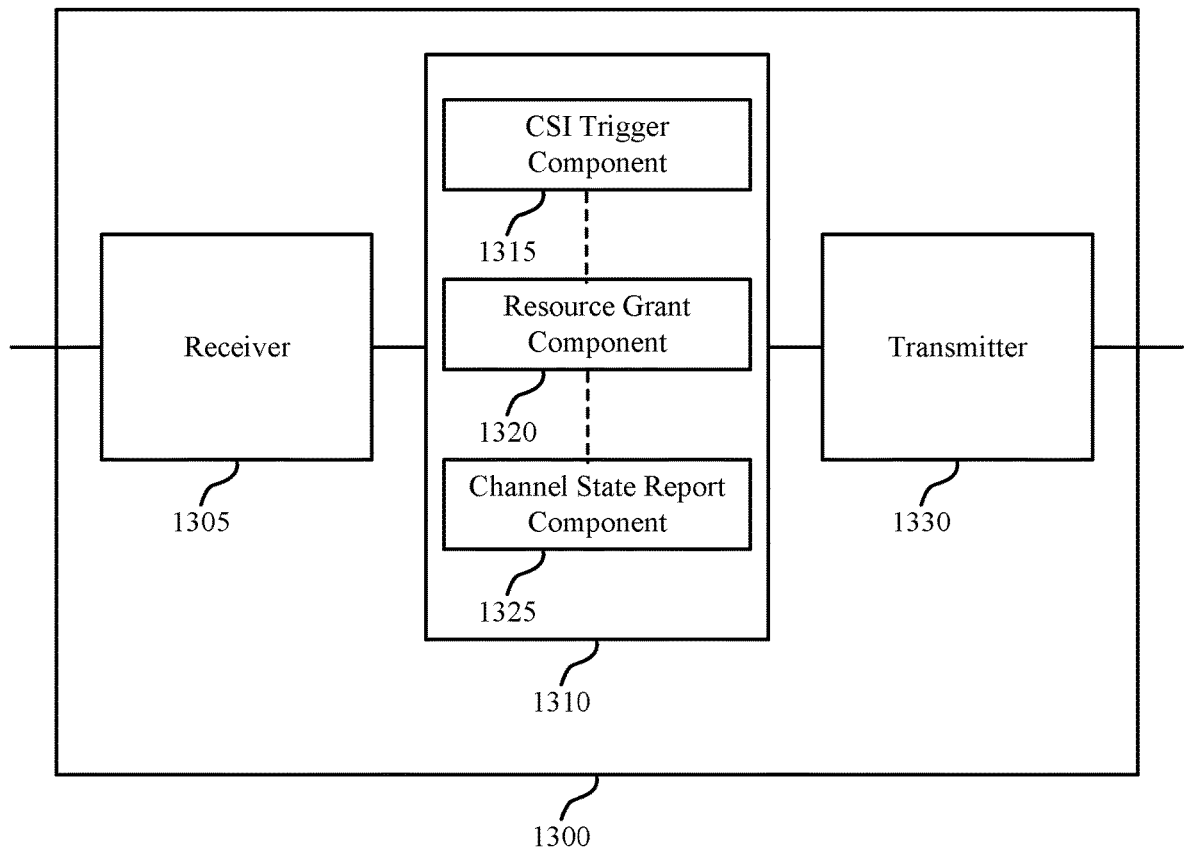

FIG. 13 shows a block diagram of a wireless device 1300 that supports channel state computation in eCA in accordance with various aspects of the present disclosure. Wireless device 1300 may be an example of aspects of a wireless device 1200 or a base station 105 described with reference to FIGS. 1, 2 and 12. Wireless device 1300 may include receiver 1305, CSI manager 1310 and transmitter 1330. Wireless device 1300 may also include a processor. Each of these components may be in communication with each other.

The receiver 1305 may receive information which may be passed on to other components of the device. The receiver 1305 may also perform the functions described with reference to the receiver 1205 of FIG. 12. The receiver 1305 may be an example of aspects of the transceiver 1525 described with reference to FIG. 15.

The CSI manager 1310 may be an example of aspects of CSI manager 1215 described with reference to FIG. 12. The CSI manager 1310 may include CSI trigger component 1315, resource grant component 1320 and channel state report component 1325. The CSI manager 1310 may be an example of aspects of the CSI manager 1505 described with reference to FIG. 15.

The CSI trigger component 1315 may transmit a trigger for a channel state report in a first subframe. The resource grant component 1320 may transmit a resource grant for the channel state report in a second subframe. The channel state report component 1325 may transmit a channel state reporting configuration that is based on the channel state reporting process limit, and receive the channel state report on resources assigned by the resource grant based on the trigger.

The transmitter 1330 may transmit signals received from other components of wireless device 1300. In some examples, the transmitter 1330 may be collocated with a receiver in a transceiver module. For example, the transmitter 1330 may be an example of aspects of the transceiver 1525 described with reference to FIG. 15. The transmitter 1330 may utilize a single antenna, or it may utilize a plurality of antennas.

Figure 14:
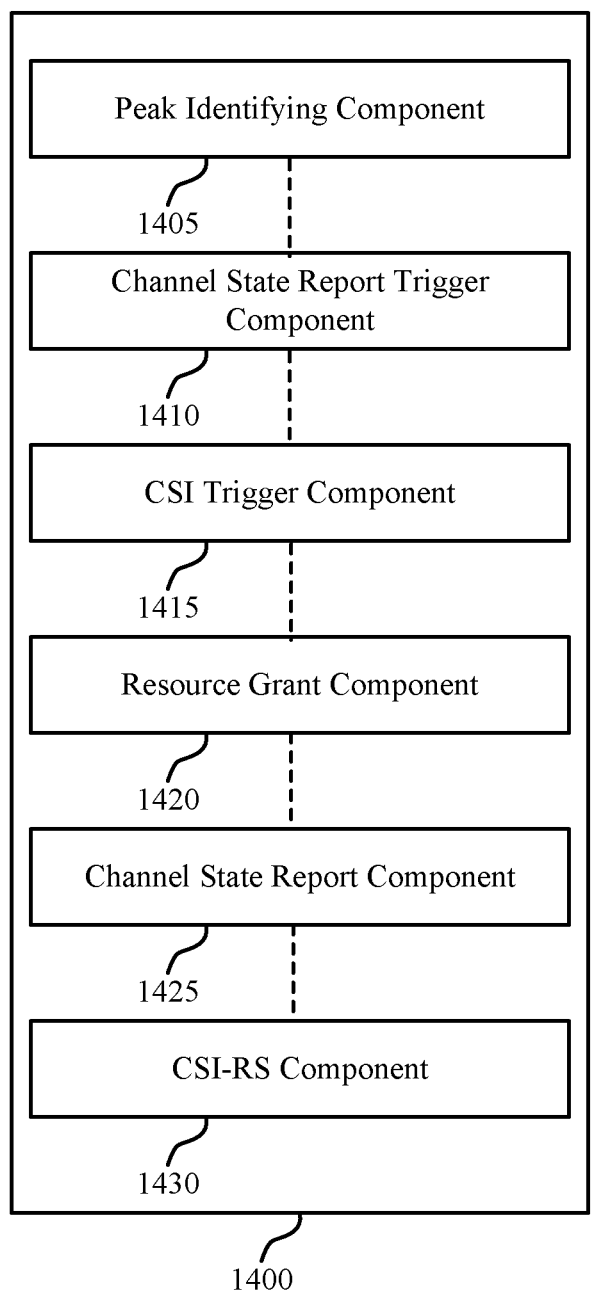

FIG. 14 shows a block diagram of a CSI manager 1400 which may be an example of the corresponding component of wireless device 1200 or wireless device 1300. That is, CSI manager 1400 may be an example of aspects of CSI manager 1215 or CSI manager 1310 described with reference to FIGS. 12 and 13. The CSI manager 1400 may also be an example of aspects of the CSI manager 1505 described with reference to FIG. 15.

The CSI manager 1400 may include peak identifying component 1405, channel state report trigger component 1410, CSI trigger component 1415, resource grant component 1420, channel state report component 1425 and CSI-RS component 1430. Each of these modules may communicate, directly or indirectly, with one another (e.g., via one or more buses).

The peak identifying component 1405 may identify a peak number of channel state report processes for a subframe based on the channel state reporting process limit, and the channel state reporting configuration may be based on the peak number of channel state report processes for the subframe.

The channel state report trigger component 1410 may transmit a channel state report trigger based on the channel state reporting configuration, and the channel state report trigger may indicate a plurality of subframes for channel state reports.

The CSI trigger component 1415 may transmit a trigger for a channel state report in a first subframe. The resource grant component 1420 may transmit a resource grant for the channel state report in a second subframe.

The channel state report component 1425 may transmit a channel state reporting configuration that is based on the channel state reporting process limit, and receive the channel state report on resources assigned by the resource grant based on the trigger. The CSI-RS component 1430 may transmit a CSI-RS in the first subframe, and the channel state report may be processed using the CSI-RS.

Figure 15:
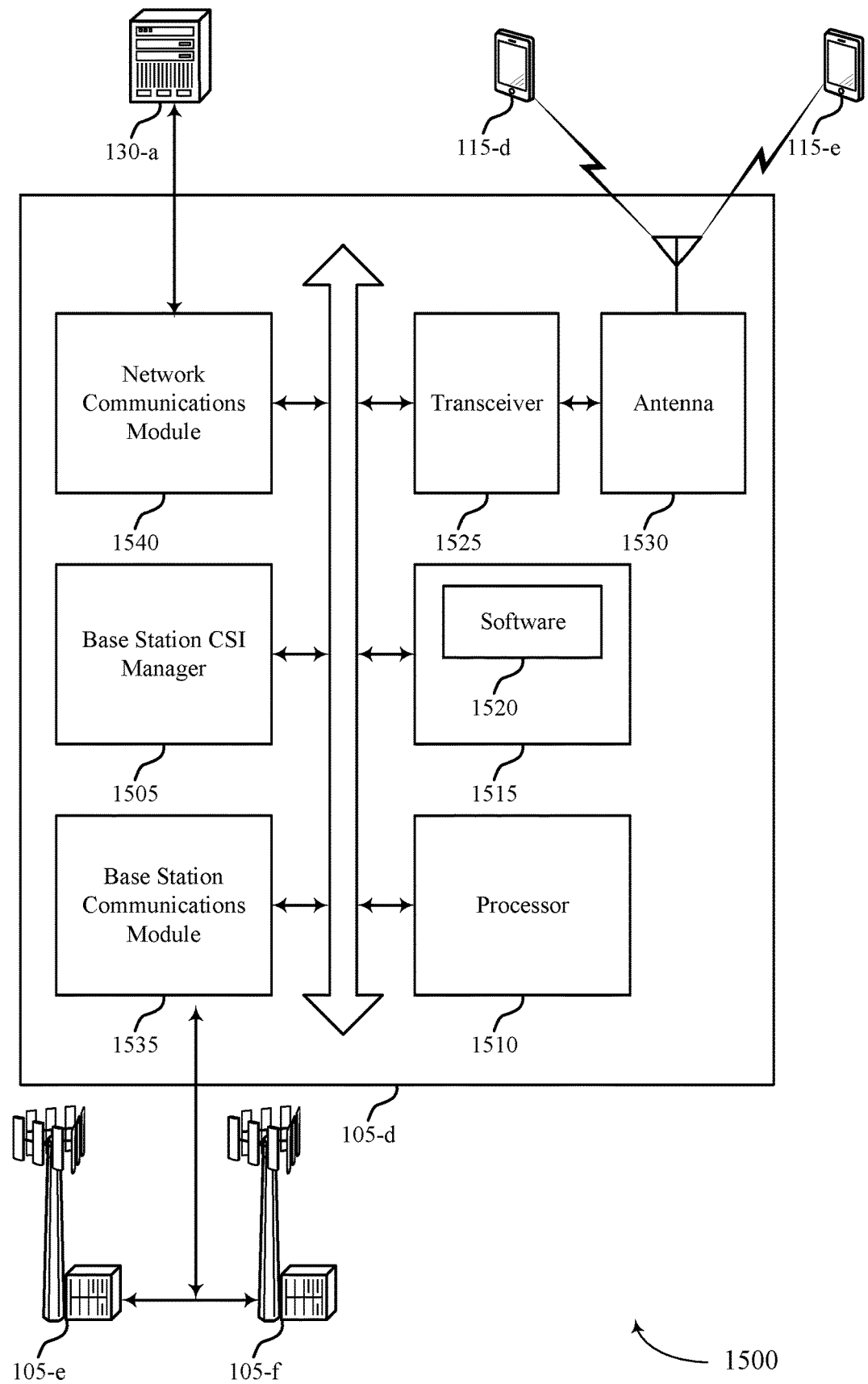
FIG. 15 illustrates a block diagram of a system including a base station that supports channel state feedback for eCA in accordance with aspects of the present disclosure.

FIG. 15 shows a diagram of a wireless system 1500 including a device configured that supports channel state computation in eCA in accordance with various aspects of the present disclosure. For example, wireless system 1500 may include base station 105-d, which may be an example of a wireless device 1200, a wireless device 1300, or a base station 105 as described with reference to FIGS. 1, 2 and 12 through 14. Base station 105-d may also include components for bi-directional voice and data communications including components for transmitting communications and components for receiving communications. For example, base station 105-d may communicate bi-directionally with one or more UEs 115. Base station 105-d may also include CSI manager 1505, processor 1510, memory 1515, transceiver 1525, antenna 1530, base station communications module 1535 and network communications module 1540. Each of these modules may communicate, directly or indirectly, with one another (e.g., via one or more buses). The CSI manager 1505 may be an example of a CSI manager as described with reference to FIGS. 12 through 14.

The processor 1510 may include an intelligent hardware device, (e.g., a CPU, a microcontroller, an ASIC, etc.) The memory 1515 may include RAM and ROM. The memory 1515 may store computer-readable, computer-executable software including instructions that, when executed, cause the processor and thus base station 105-d to perform various functions described herein (e.g., channel state computation in eCA, etc.). In some cases, the software 1520 may not be directly executable by the processor but may cause a computer (e.g., when compiled and executed) to perform functions described herein.

The transceiver 1525 may communicate bi-directionally, via one or more antennas, wired, or wireless links, with one or more networks, as described above. For example, the transceiver 1525 may communicate bi-directionally with a base station 105 or a UE 115. The transceiver 1525 may also include a modem to modulate the packets and provide the modulated packets to the antennas for transmission, and to demodulate packets received from the antennas. In some cases, the wireless device may include a single antenna 1530. However, in some cases the device may have more than one antenna 1130, which may be capable of concurrently transmitting or receiving multiple wireless transmissions.

The base station communications module 1535 may manage communications with other base station 105, and may include a controller or scheduler for controlling communications with UEs 115 in cooperation with other base stations 105. For example, the base station communications module 1535 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1540 may manage communications with the core network (e.g., via one or more wired backhaul links). For example, the network communications module 1540 may manage the transfer of data communications for client devices, such as one or more UEs 115.

Figure 16:
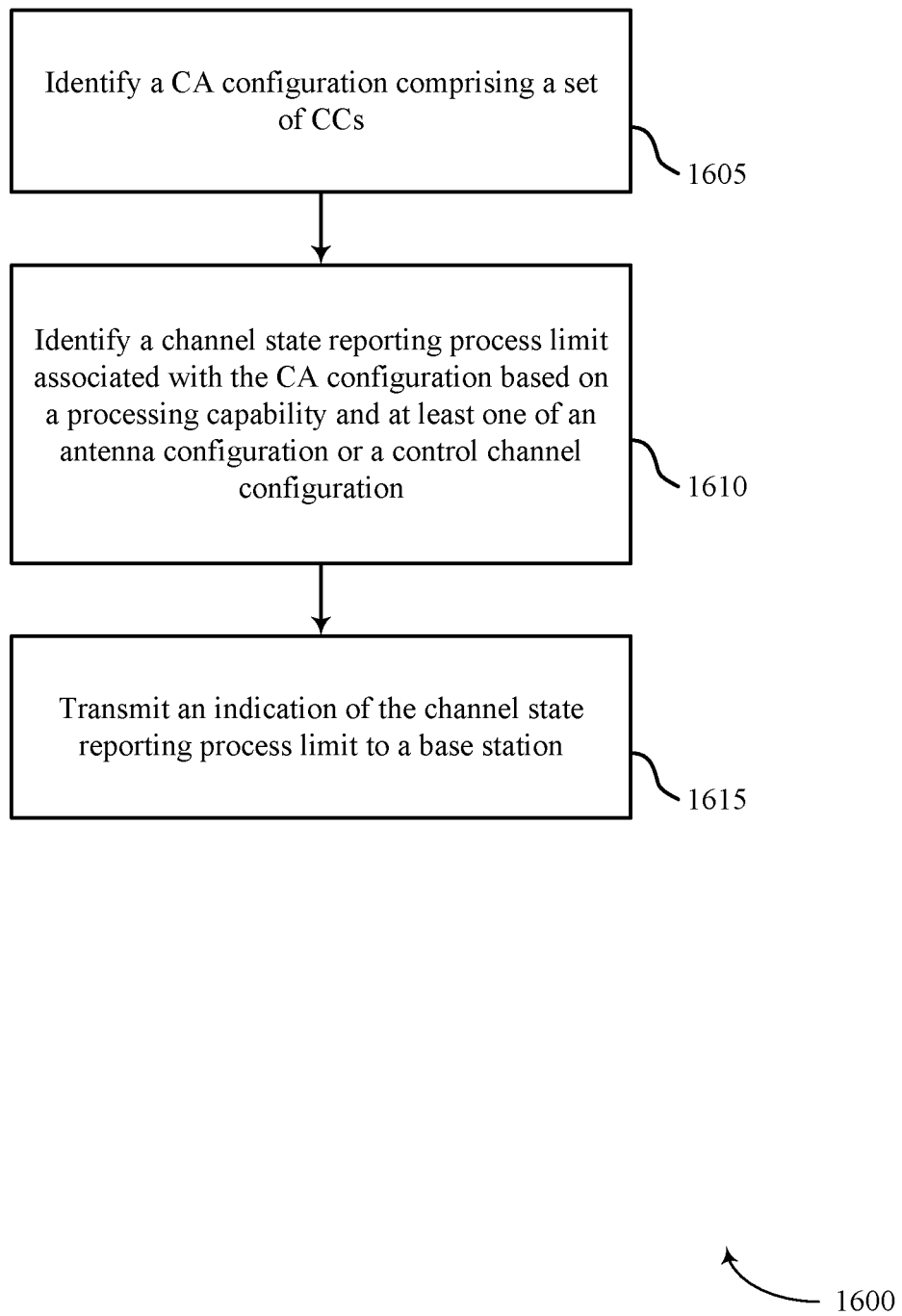
FIGS. 16 through 20 illustrate methods for channel state feedback for eCA in accordance with aspects of the present disclosure.

FIG. 16 shows a flowchart illustrating a method 1600 for channel state computation in eCA in accordance with various aspects of the present disclosure. The operations of method 1600 may be implemented by a UE 115 or its components as described with reference to FIGS. 1 and 2.

For example, the operations of method 1600 may be performed by the CSI manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may identify a CA configuration that includes a set of CCs as described above with reference to FIGS. 2 through 7. In certain examples, the operations of block 1605 may be performed by the CA component as described with reference to FIG. 9.

At block 1610, the UE 115 may identify a channel state reporting process limit associated with the CA configuration based on a processing capability and at least one of an antenna configuration or a control channel configuration as described above with reference to FIGS. 2 through 7. In certain examples, the operations of block 1610 may be performed by the process limit component as described with reference to FIG. 9.

At block 1615, the UE 115 may transmit an indication of the channel state reporting process limit to a base station as described above with reference to FIGS. 2 through 7. In certain examples, the operations of block 1615 may be performed by the process limit component as described with reference to FIG. 9.

Figure 17:
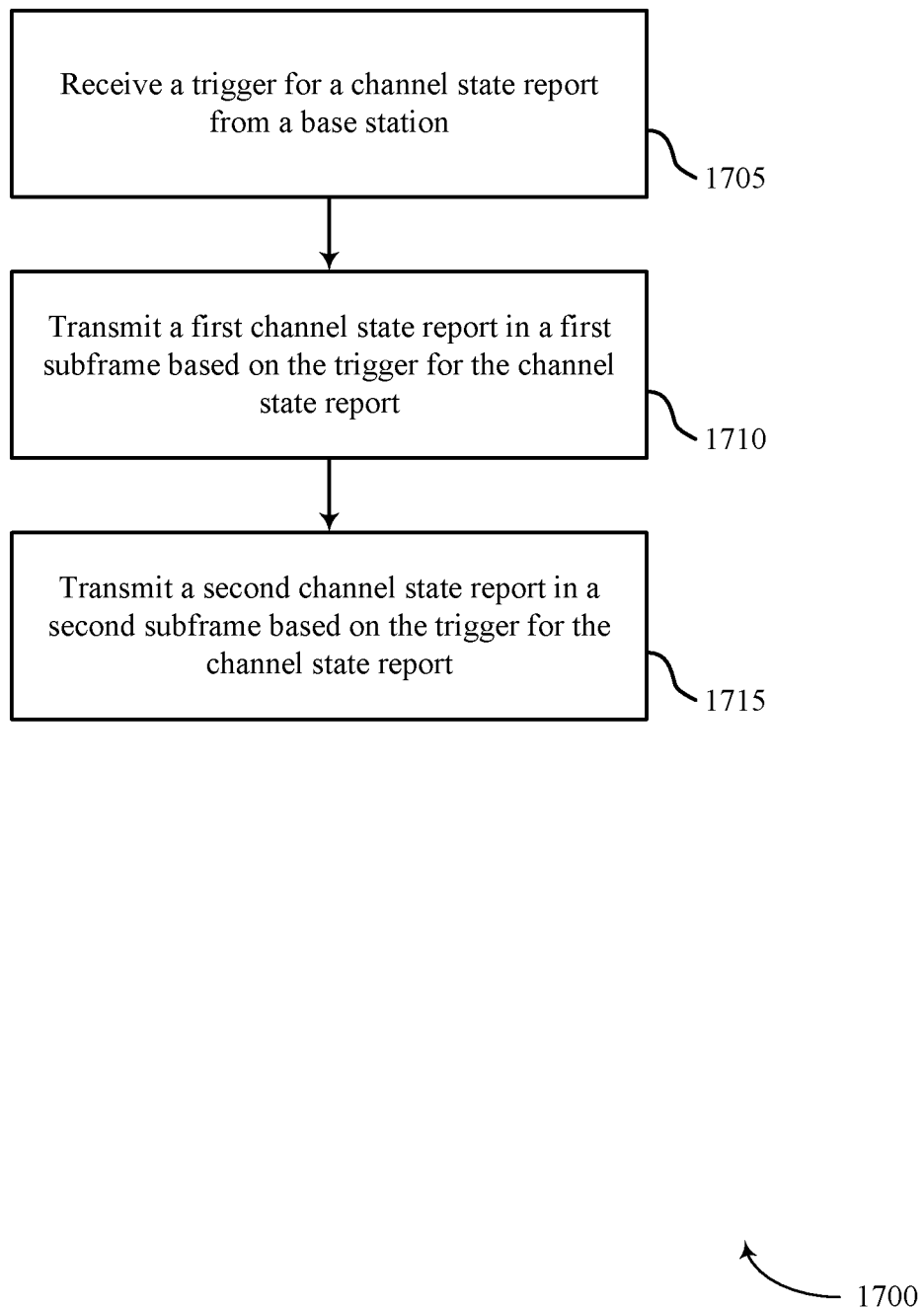

FIG. 17 shows a flowchart illustrating a method 1700 for channel state computation in eCA in accordance with various aspects of the present disclosure. The operations of method 1700 may be implemented by a UE 115 or its components as described with reference to FIGS. 1 and 2. For example, the operations of method 1700 may be performed by the CSI manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive a trigger for a channel state report from a base station as described above with reference to FIGS. 2 through 7. In certain examples, the operations of block 1705 may be performed by the CSI trigger component as described with reference to FIG. 9.

At block 1710, the UE 115 may transmit a first channel state report in a first subframe based on the trigger for the channel state report as described above with reference to FIGS. 2 through 7. In certain examples, the operations of block 1710 may be performed by the channel state report component as described with reference to FIG. 9.

At block 1715, the UE 115 may transmit a second channel state report in a second subframe based on the trigger for the channel state report as described above with reference to FIGS. 2 through 7. In certain examples, the operations of block 1715 may be performed by the channel state report component as described with reference to FIG. 9.

Figure 18:
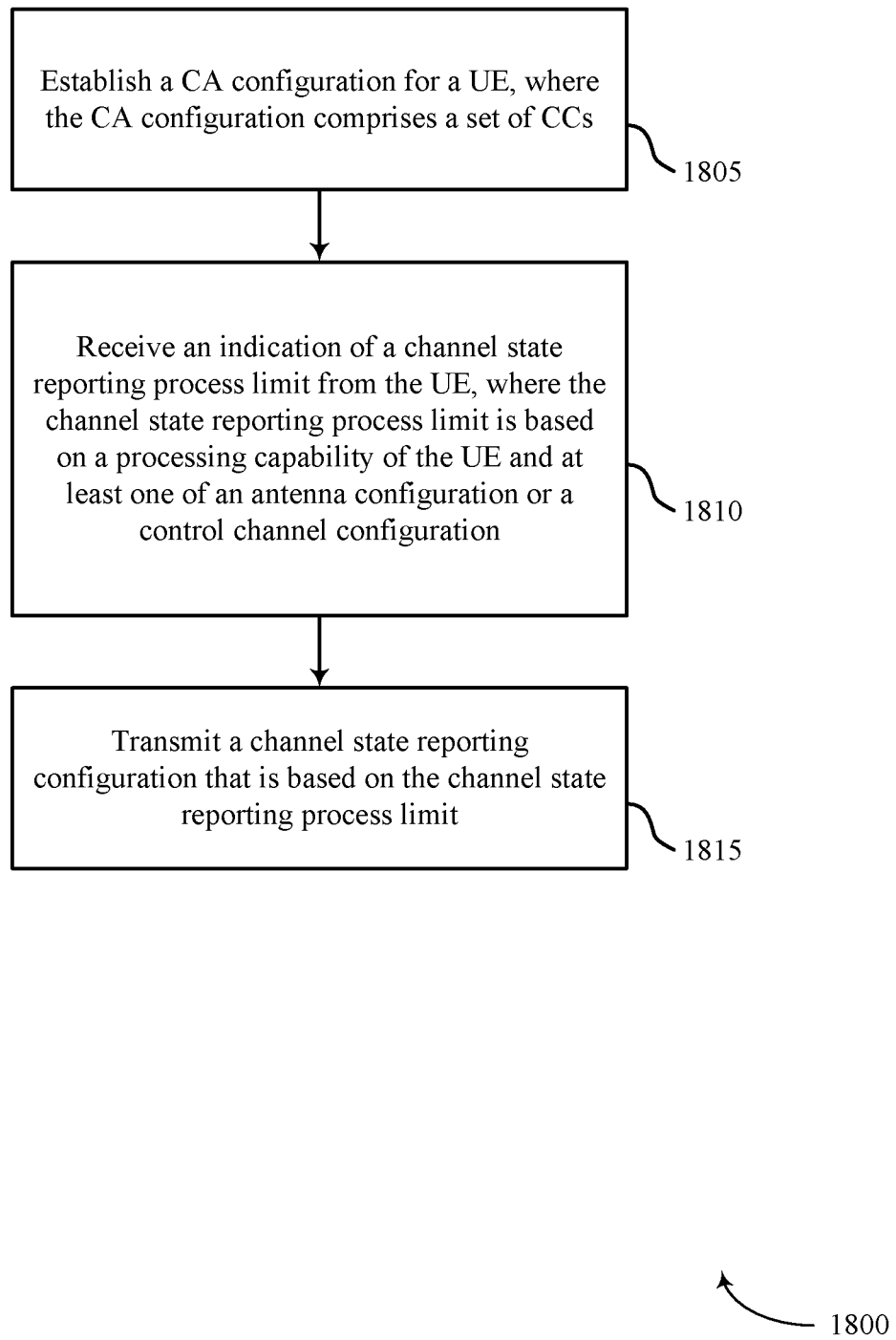

FIG. 18 shows a flowchart illustrating a method 1800 for channel state computation in eCA in accordance with various aspects of the present disclosure. The operations of method 1800 may be implemented by a base station 105 or its components as described with reference to FIGS. 1 and 2. For example, the operations of method 1800 may be performed by the CSI manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may establish a CA configuration for a UE, where the CA configuration that includes a set of CCs as described above with reference to FIGS. 2 through 7. In certain examples, the operations of block 1805 may be performed by the CA configuration component as described with reference to FIG. 13.

At block 1810, the base station 105 may receive an indication of a channel state reporting process limit from the UE, where the channel state reporting process limit is based on a processing capability of the UE and at least one of an antenna configuration or a control channel configuration as described above with reference to FIGS. 2 through 7. In certain examples, the operations of block 1810 may be performed by the process limit component as described with reference to FIG. 13.

At block 1815, the base station 105 may transmit a channel state reporting configuration that is based on the channel state reporting process limit as described above with reference to FIGS. 2 through 7. In certain examples, the operations of block 1815 may be performed by the channel state report component as described with reference to FIG. 13.

Figure 19:
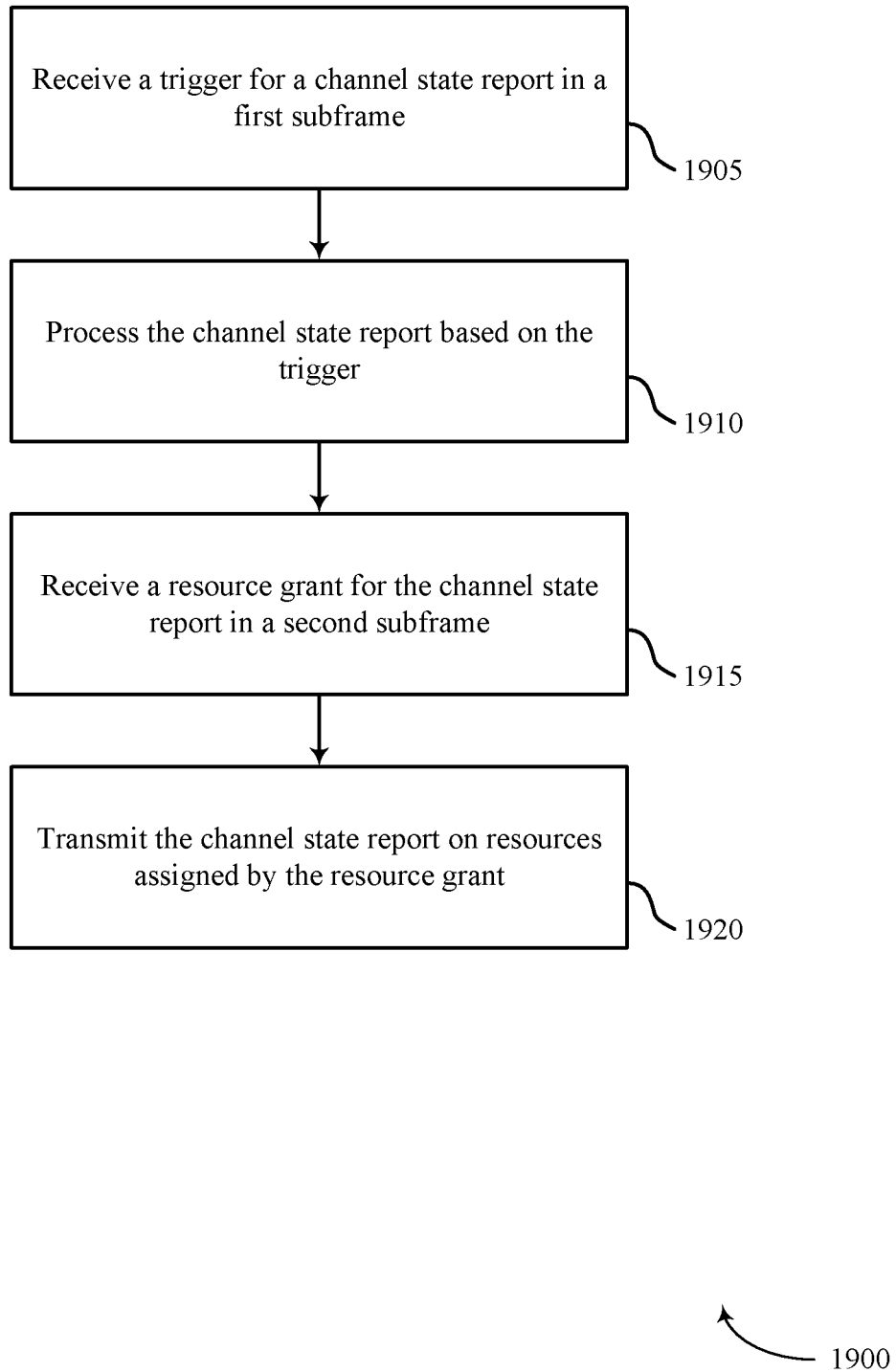

FIG. 19 shows a flowchart illustrating a method 1900 for channel state computation in eCA in accordance with various aspects of the present disclosure. The operations of method 1900 may be implemented by a UE 115 or its components as described with reference to FIGS. 1 and 2. For example, the operations of method 1900 may be performed by the CSI manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may receive a trigger for a channel state report in a first subframe as described above with reference to FIGS. 2 through 7. In certain examples, the operations of block 1905 may be performed by the CSI trigger component as described with reference to FIG. 9.

At block 1910, the UE 115 may process the channel state report based on the trigger as described above with reference to FIGS. 2 through 7. In certain examples, the operations of block 1910 may be performed by the channel state report component as described with reference to FIG. 9.

At block 1915, the UE 115 may receive a resource grant for the channel state report in a second subframe as described above with reference to FIGS. 2 through 7. In certain examples, the operations of block 1915 may be performed by the resource grant component as described with reference to FIG. 9.

At block 1920, the UE 115 may transmit the channel state report on resources assigned by the resource grant as described above with reference to FIGS. 2 through 7. In certain examples, the operations of block 1920 may be performed by the channel state report component as described with reference to FIG. 9.

Figure 20:
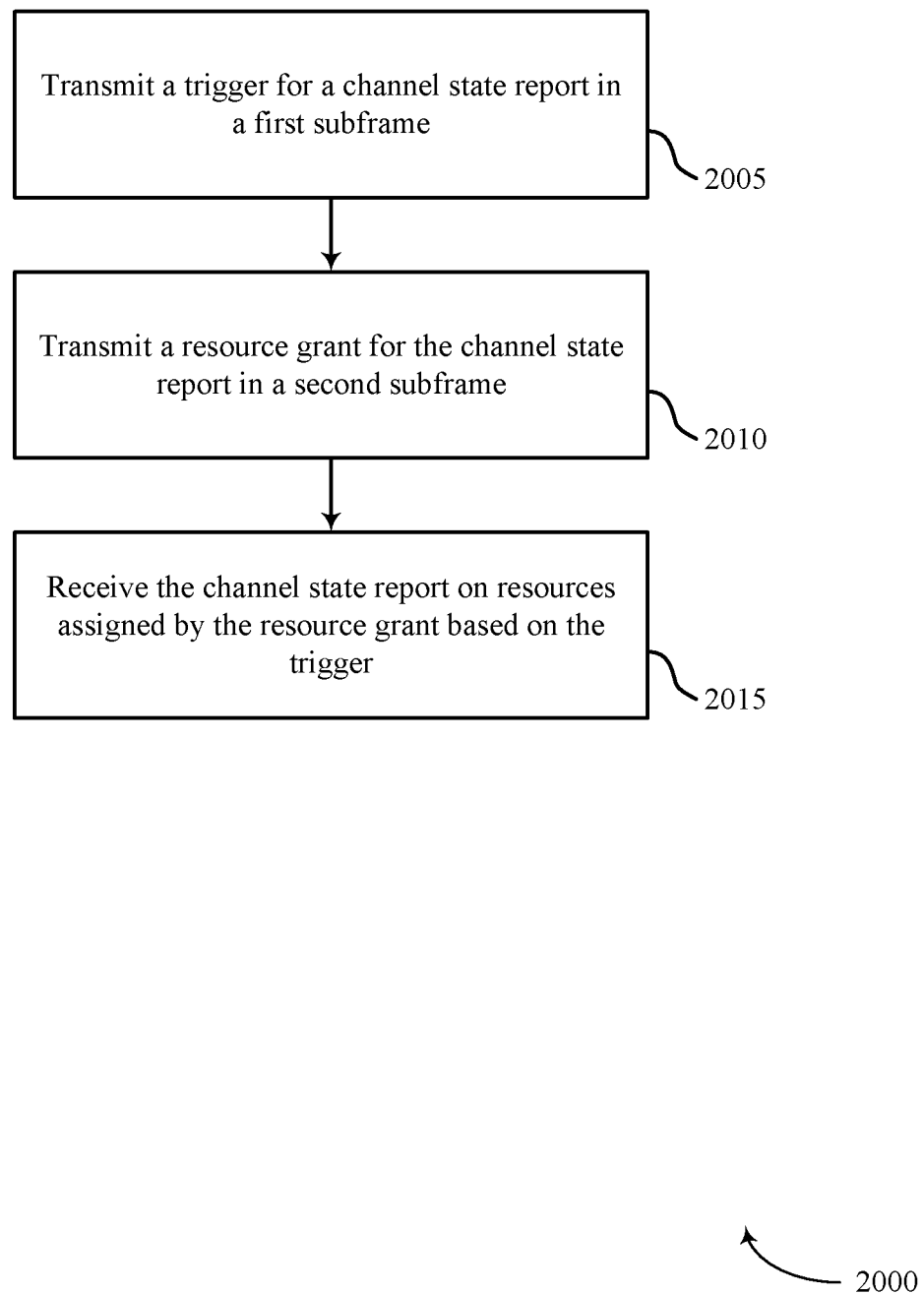

FIG. 20 shows a flowchart illustrating a method 2000 for channel state computation in eCA in accordance with various aspects of the present disclosure. The operations of method 2000 may be implemented by a base station 105 or its components as described with reference to FIGS. 1 and 2. For example, the operations of method 2000 may be performed by the CSI manager as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may transmit a trigger for a channel state report in a first subframe as described above with reference to FIGS. 2 through 7. In certain examples, the operations of block 2005 may be performed by the CSI trigger component as described with reference to FIG. 13.

At block 2010, the base station 105 may transmit a resource grant for the channel state report in a second subframe as described above with reference to FIGS. 2 through 7. In certain examples, the operations of block 2010 may be performed by the resource grant component as described with reference to FIG. 13.

At block 2015, the base station 105 may receive the channel state report on resources assigned by the resource grant based on the trigger as described above with reference to FIGS. 2 through 7. In certain examples, the operations of block 2015 may be performed by the channel state report component as described with reference to FIG. 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for channel state computation in eCA.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for channel state computation in eCA. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method performed by a user equipment (UE) in a wireless communication system comprising:
   identifying a carrier aggregation (CA) configuration of the UE comprising a plurality of component carriers (CCs);
   identifying a channel state reporting process limit associated with the CA configuration based at least in part on a processing capability of the UE and at least one of an antenna configuration or a control channel configuration;
   transmitting an indication of the antenna configuration to a base station, wherein the antenna configuration comprises a number of receive antennas and the channel state reporting process limit is identified based at least in part on the number of receive antennas;
   determining that a number of channel state reports exceeds the channel state reporting process limit;
   receiving, from the base station, a prioritized order of channel state reports;
   prioritizing one or more channel state reports based at least in part on the prioritized order and the channel state reporting process limit;
   receiving, from the base station, a trigger for channel state reporting in accordance with the channel state reporting process limit;

transmitting a first channel state report in a first subframe based at least in part on the trigger and according to the channel state reporting process limit and prioritization; and transmitting a second channel state report in a second subframe based at least in part on the trigger and according to the channel state reporting process limit and prioritization.

2. The method of claim 1, further comprising:
transmitting an indication of the channel state reporting process limit to the base station.

3. The method of claim 2, wherein the indication of the channel state reporting process limit comprises a number of channel state processes for each CC of the plurality of CCs.

4. The method of claim 1, wherein the control channel configuration comprises a physical downlink control channel (PDCCH) and the channel state reporting process limit is identified based at least in part on monitoring downlink (DL) signaling in the PDCCH.

5. The method of claim 1, wherein the control channel configuration comprises an enhanced physical downlink control channel (ePDCCH) and the channel state reporting process limit is identified based at least in part on monitoring DL signaling in the ePDCCH.

6. The method of claim 1, further comprising:
determining that a number of processes associated with channel state reports associated with the trigger exceeds a threshold; and
transmitting a non-current channel state report during the first subframe or the second subframe based at least in part on the determination, wherein the non-current channel state report is associated with a previous trigger.

7. A method of wireless communication comprising:
establishing a carrier aggregation (CA) configuration for a user equipment (UE), wherein the CA configuration comprises a plurality of CCs;
receiving an indication of a channel state reporting process limit from the UE, wherein the channel state reporting process limit is associated with a processing capability of the UE and at least one of an antenna configuration or a control channel configuration of the UE;
receiving an indication of the antenna configuration from the UE, wherein the antenna configuration comprises a number of receive antennas available at the UE and the channel state reporting process limit is identified based at least in part on the number of receive antennas;
determining a prioritized order of channel state reports based at least in part on a number of channel state reports exceeding the channel state reporting process limit;
transmitting the prioritized order of channel state reports;
transmitting a trigger for channel state reporting in accordance with the channel state reporting process limit, wherein the trigger for channel state reporting indicates a plurality of subframes for channel state reports;
receiving a first channel state report in a first subframe based at least in part on the trigger for channel state reporting and according to the channel state reporting process limit and prioritization; and
receiving a second channel state report in a second subframe based at least in part on the trigger for channel state reporting and according to the channel state reporting process limit and prioritization.

8. The method of claim 7, further comprising:
transmitting a channel state reporting configuration for the plurality of CCs in the CA configuration that is based at least in part on the channel state reporting process limit.

9. The method of claim 8, further comprising:
receiving one or more channel state reports according to the channel state reporting process limit.

10. The method of claim 8, further comprising:
identifying a peak number of channel state report processes for a subframe based at least in part on the channel state reporting process limit, wherein the channel state reporting configuration is based on the peak number of channel state report processes for the subframe and wherein the peak number is a maximum number of channel state report processes that the UE processes during the subframe.

11. The method of claim 8, wherein:
transmitting the trigger for channel state reporting is based at least in part on the channel state reporting configuration.

12. The method of claim 7, wherein the control channel configuration comprises an enhanced physical downlink control channel (ePDCCH).

13. The method of claim 7, wherein the indication of the channel state reporting process limit comprises a number of channel state processes for each CC of the plurality of CCs.

14. The method of claim 7, wherein the channel state reporting process limit is associated with a number of channel state information reference signal (CSI-RS) based reports, a number of cell-specific reference signals (CRS) based reports, a number of periodic CSI reports, a number of aperiodic CSI reports, or any combination thereof.

15. An apparatus for wireless communication by a user equipment (UE), comprising:
a processor;
memory in electronic communication with the processor; and
instructions stored in the memory and operable, when executed by the processor, to cause the apparatus to:
identify a carrier aggregation (CA) configuration of the UE comprising a plurality of component carriers (CCs);
identify a channel state reporting process limit associated with the CA configuration based at least in part on a processing capability of the UE and at least one of an antenna configuration or a control channel configuration;
transmit an indication of the antenna configuration to a base station, wherein the antenna configuration comprises a number of receive antennas and the channel state reporting process limit is identified based at least in part on the number of receive antennas;
determine that a number of channel state reports exceeds the channel state reporting process limit;
receive, from the base station, a prioritized order of channel state reports;
prioritize one or more channel state reports based at least in part on the prioritized order and the channel state reporting process limit;
receive, from the base station, a trigger for channel state reporting in accordance with the channel state reporting process limit;
transmit a first channel state report in a first subframe based at least in part on the trigger and according to the channel state reporting process limit and prioritization; and transmit a second channel state report in a second subframe based at least in part on the trigger and according to the channel state reporting process limit and prioritization.

16. The apparatus of claim 15, wherein the instructions are operable to cause the apparatus to:
transmit an indication of the channel state reporting process limit to the base station.

17. The apparatus of claim 16, wherein the indication of the channel state reporting process limit comprises a number of channel state processes for each CC of the plurality of CCs.

18. An apparatus for wireless communication, comprising:
a processor;
memory in electronic communication with the processor; and
instructions stored in the memory and operable, when executed by the processor, to cause the apparatus to:
establish a carrier aggregation (CA) configuration for a user equipment (UE), wherein the CA configuration comprises a plurality of CCs;
receive an indication of a channel state reporting process limit from the UE, wherein the channel state reporting process limit is associated with a processing capability of the UE and at least one of an antenna configuration or a control channel configuration of the UE;
receive an indication of the antenna configuration from the UE, wherein the antenna configuration comprises a number of receive antennas available at the UE and the channel state reporting process limit is identified based at least in part on the number of receive antennas;
determine a prioritized order of channel state reports based at least in part on a number of channel state reports exceeding the channel state reporting process limit;
transmit the prioritized order of channel state reports;
transmit a trigger for channel state reporting in accordance with the channel state reporting process limit, wherein the trigger for channel state reporting indicates a plurality of subframes for channel state reports;
receive a first channel state report in a first subframe based at least in part on the trigger for channel state reporting and according to the channel state reporting process limit and prioritization; and
receive a second channel state report in a second subframe based at least in part on the trigger for channel state reporting and according to the channel state reporting process limit and prioritization.

19. The apparatus of claim 18, wherein the instructions are operable to cause the apparatus to:
transmit a channel state reporting configuration for the plurality of CCs in the CA configuration that is based at least in part on the channel state reporting process limit.

20. The apparatus of claim 19, wherein the instructions are operable to cause the apparatus to:
identify a peak number of channel state report processes for a subframe based at least in part on the channel state reporting process limit, wherein the channel state reporting configuration is based on the peak number of channel state report processes for the subframe and wherein the peak number is a maximum number of channel state report processes that the UE processes during the subframe.

* * * * *